(12) United States Patent
Takano et al.

(10) Patent No.: US 10,022,898 B2
(45) Date of Patent: Jul. 17, 2018

(54) METHOD FOR MOLDING FIBER-REINFORCED PLASTIC, AND MOLDING DEVICE FOR SAME

(71) Applicant: Mitsubishi Rayon Co., Ltd., Tokyo (JP)

(72) Inventors: Tsuneo Takano, Toyohashi (JP); Yuuji Kazehaya, Toyohashi (JP); Mitsushi Nishimura, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 695 days.

(21) Appl. No.: 14/407,203

(22) PCT Filed: Jun. 11, 2013

(86) PCT No.: PCT/JP2013/066059
§ 371 (c)(1),
(2) Date: Dec. 11, 2014

(87) PCT Pub. No.: WO2013/187399
PCT Pub. Date: Dec. 19, 2013

(65) Prior Publication Data
US 2015/0183139 A1    Jul. 2, 2015

(30) Foreign Application Priority Data

Jun. 12, 2012  (JP) .................................. 2012-133239
Jun. 12, 2012  (JP) .................................. 2012-133240

(51) Int. Cl.
*B29C 70/44*   (2006.01)
*B29C 43/18*   (2006.01)
(Continued)

(52) U.S. Cl.
CPC .............. *B29C 43/18* (2013.01); *B29C 33/54* (2013.01); *B29C 43/10* (2013.01); *B29C 43/36* (2013.01);
(Continued)

(58) Field of Classification Search
CPC ........ B29C 2043/106; B29C 2043/108; B29C 2043/3613; B29C 43/10
See application file for complete search history.

(56) References Cited

U.S. PATENT DOCUMENTS 4,294,639 A    10/1981  Woelfel et al.
4,439,123 A *   3/1984  Sano ..................... B29C 43/203
                                                    425/112
(Continued)

FOREIGN PATENT DOCUMENTS

JP    S55-133949 A    10/1980
JP    S60-206618 A    10/1985
(Continued)

OTHER PUBLICATIONS

Communication pursuant to Article 94(3) EPC dated Jul. 25, 2016 in the corresponding European patent application No. 13 805 003.4.
(Continued)

*Primary Examiner* — Galen H Hauth
(74) *Attorney, Agent, or Firm* — Morgan, Lewis & Bockius LLP

(57) ABSTRACT

A method for molding fiber-reinforced plastic. A core is formed in a desired shape by accommodating, in a flexible bag, a grain group containing plurality of grains. The core is placed inside a prepreg containing resin and fibers, and the prepreg, in which the core is housed is placed in a molding die and compression molded. When doing so, the grain group contains first and second grains (a,b) that satisfy the equation (1). (1) $1.1 \leq (D_a/D_b) \leq 2.0$ In the equation $D_a$ is the
(Continued)

grain diameter of the grains (a), and Db is the grain diameter of the grain (b). When using a molding die to mold a molded article having a cavity, the above mentioned molding method enables an increase in the internal pressure of the core in order to change the peripheral surface area of the core, without using a pressurized gas and/or pressurized liquid.

26 Claims, 10 Drawing Sheets

(51) Int. Cl.
| | |
|---|---|
| *B29C 43/36* | (2006.01) |
| *B29C 43/10* | (2006.01) |
| *B29C 33/54* | (2006.01) |
| *B29C 70/46* | (2006.01) |
| *B29C 70/02* | (2006.01) |
| *B60B 5/02* | (2006.01) |
| *B29L 22/00* | (2006.01) |
| *B29C 43/32* | (2006.01) |
| *B29K 105/08* | (2006.01) |
| *B29K 105/12* | (2006.01) |
| *B29L 31/00* | (2006.01) |

(52) U.S. Cl.
CPC ............ *B29C 70/021* (2013.01); *B29C 70/44* (2013.01); *B29C 70/46* (2013.01); *B29C 43/3642* (2013.01); *B29C 2043/106* (2013.01); *B29C 2043/3222* (2013.01); *B29C 2043/3613* (2013.01); *B29C 2043/3649* (2013.01); *B29C 2043/3655* (2013.01); *B29C 2043/3665* (2013.01); *B29K 2105/0872* (2013.01); *B29K 2105/12* (2013.01); *B29L 2022/00* (2013.01); *B29L 2031/00* (2013.01); *B60B 5/02* (2013.01)

(56) References Cited

U.S. PATENT DOCUMENTS

| | | | | |
|---|---|---|---|---|
| 4,624,820 | A | * | 11/1986 | Barraclough ............ B29C 43/32 264/102 |
| 5,009,687 | A | * | 4/1991 | Kromrey ................. B29C 70/44 264/257 |
| 5,262,118 | A | | 11/1993 | Fukushima et al. |
| 8,580,176 | B2 | | 11/2013 | Graham |
| 8,673,106 | B1 | * | 3/2014 | Jolley ..................... B29C 43/18 156/285 |
| 2002/0195220 | A1 | * | 12/2002 | Jacobson ............ B29C 33/3821 164/15 |
| 2003/0034588 | A1 | * | 2/2003 | Miura ..................... B29C 43/10 264/258 |
| 2009/0087599 | A1 | | 4/2009 | Cheng et al. |
| 2009/0309268 | A1 | * | 12/2009 | Cavaliere ............ B29C 33/3821 264/511 |
| 2011/0226660 | A1 | | 9/2011 | Le Hetet et al. |

FOREIGN PATENT DOCUMENTS

| | | | |
|---|---|---|---|
| JP | 02-238912 | A | 9/1990 |
| JP | 04-294132 | A | 10/1992 |
| JP | 07-100856 | A | 4/1995 |
| JP | 4118685 | B2 | 5/2008 |
| JP | 2011-152753 | A | 8/2011 |
| JP | 2012-111100 | A | 6/2012 |
| JP | 2012-187730 | A | 10/2012 |
| JP | 2012-206391 | A | 10/2012 |

OTHER PUBLICATIONS

International Search Report dated Oct. 8, 2013 for International Application No. PCT/JP2013/066059.
European Search Report issued in corresponding European Patent Application No. 13805003.4 dated Nov. 30, 2015.

* cited by examiner

METHOD FOR MOLDING FIBER-REINFORCED PLASTIC, AND MOLDING DEVICE FOR SAME

TECHNICAL FIELD

The present invention relates to a molding method and a molding device for manufacturing a molded article of a fiber-reinforced plastic having a closed cross-section by using a core and by heating and pressurizing a prepreg made by impregnating fiber with a resin.

BACKGROUND ART

A fiber-reinforced plastic molded article having a closed cross-section is widely used in a range from large molded articles such as the body or wings of an aircraft to small molded articles such as a bicycle frame, a tennis racket, a fishing rod, and a golf shaft. In addition, a fiber-reinforced plastic molded article having an open cross-section is widely used for helmets and the like.

As a core for forming the closed cross-section, a core formed into a predetermined shape by wrapping a group of powder particles and/or a group of grains (hereinafter, a powder grain group) in a packaging film and vacuum-packaging the result, a core using a molded product formed by blow molding, and the like are used. A method for molding a molded product using a core which is made by having a vacuum-packaged powder grain group formed into a predetermined shape is disclosed in, for example, JP 2-238912 A (Patent Document 1). In addition, the core formed by the blow molding is used in a method for manufacturing a multilayer plastic molded product disclosed, for example, in JP 7-100856 (Patent Document 2).

The invention described in Patent Document 1 will be described with reference to FIGS. 12 to 14 as Conventional Example 1 related to the method for molding a fiber-reinforced plastic molded article having a closed cross-section according to the present invention. FIG. 12 illustrates an intermediate state in the process of manufacturing a molded article having a hollow portion which is one type of closed cross-section by using a mold 30. That is, a sheet-like lower fiber-reinforced thermoplastic resin material (hereinafter, referred to as lower FRTP) 34 which has been pre-heated into a molten state is placed on the lower mold 31 of the mold 30. Since the lower FRTP 34 is in the molten state, the lower FRTP 34 is hung and depressed in a concave portion of the lower mold 31 by its own weight.

A core 33 formed by wrapping a powder grain group 33a in a packaging material 33b and solidifying the result into a predetermined shape by vacuum packaging is placed in the concave portion of the lower FRTP 34. On the upper portion of the lower FRTP 34 in which the core 33 is placed, another sheet-like fiber-reinforced thermoplastic resin material (hereinafter, referred to as upper FRTP) 35 which has been heated to be in a molten state is placed. In this state, the periphery of the core 33 is in a state of being enclosed by the lower FRTP 34 and the upper FRTP 35.

The upper mold 32 of the mold 30 is lowered from this state to heat and cure the lower FRTP 34 and the upper FRTP 35 between the upper mold 32 and the lower mold 31 such that the lower FRTP 34 and the upper FRTP 35 are integrally molded in a state of accommodating the core 33 therein. In order to discharge the core 33 from the semi-finished product produced here, one or more small holes which communicate with the inside of the core 33 are bored through the semi-finished product. When the holes are bored through the semi-finished product, air infiltrates into the powder grain group 33a of the vacuum-packaged core 33 and the binding of the powder grain group 33a is loosened.

In addition, at least the powder grain group 33a included in the core 33 is discharged to the outside of the semi-finished product through the holes bored through the semi-finished product, thereby completing a molded article. If the packaging material 33b in which the powder grain group 33a is packaged is made of a material having good releasability from the molded article, the packaging material 33b can be released leaving the hollow portion of the molded article.

The invention described in Patent Document 2 will be described with reference to FIG. 15 as Conventional Example 2 related to the present invention. FIG. 15 illustrates a state where a core 43 molded by blow molding is set between molds 41a and 41b used for forming an outer layer. As illustrated in FIG. 15, the molds 41a and 41b are configured to accommodate the core 43 therein, and when the molds 41a and 41b are closed, a cavity as a hollow portion is formed to be filled with a molten resin between respective molding surfaces 42a and 42b of the molds 41a and 41b and the core 43.

Molten resin 45 which is plasticized by an extruder 44 is supplied into the cavity. By supplying the molten resin 45 into the cavity in the molds 41a and 41b in the closed state, a product having a hollow portion and desired shape can be molded by integrating the core 43 with the molten resin on the core 43. However, in a case where the heat resistance of the core 43 is low compared to the temperature of the molten resin or in a case where the thickness of the core 43 is small, the core 43 may be deformed in the molding process by the pressure applied to the core 43 in the process. In addition, in a case a wide flat part is present as the shape of the core 43, the rigidity of the flat part is likely to be insufficient, and thus the core 43 may be deformed.

In order to prevent the deformation of the core 43, in the invention described in Patent Document 2, a configuration in which the internal pressure of the core 43 can be increased is employed. As a configuration for this, a pressurizing unit 46 which communicates with the inside of the core 43 is provided, and pressurized gas or liquid is introduced into the core 43 from the pressurizing unit 46 to increase the internal pressure of the core 43 and prevent the deformation thereof.

On the other hand, a method for molding a fiber-reinforced plastic molded article having an open cross-section is disclosed in, for example, JP 4118685 B2 (Patent Document 3). FIG. 16 corresponds to a figure attached to Patent Document 3. In the molding method, a mold assembly 57, in which a fiber-reinforced plastic material (composite layup) is disposed between one or more pair(s) of separated mold parts 57a and 57b which form a mold cavity for the fiber-reinforced plastic molded body, is disposed to be interposed between a pair of elastically-deformable chamber walls 55 and 55 which are fixed to the first and the second pressure chambers 51 and 52 to oppose each other. Fluid heated and pressurized to predetermined levels is circulated through the first and second pressure chambers 51 and 52. Each pair of mold parts 57a and 57b respectively correspond to a so-called a pair of male and female molds in typical molding.

The mold assembly 57 is heated and pressurized by the circulating fluid heated and pressurized to required levels via the respective chamber walls 55 and 55 of the first and second pressure chambers 51 and 52. During the heating and pressurizing, the pressure chambers 51 and 52 hold a state in which the elastically-deformable chamber walls 55 and 55 are arranged, and the fiber-reinforced plastic material is compressed via the mold parts 57a and 57b and cured, thereby a fiber-reinforced plastic structure is molded.

CITATION LIST

Patent Document

Patent Document 1: JP 2-238912 A
Patent Document 2: JP 7-100856 A
Patent Document 3: JP 4118685 B2

DISCLOSURE OF THE INVENTION

Problem to be Solved by the Invention

However, in the invention disclosed in Patent Document 1, in a state where the core 33 is interposed between the lower FRTP 34 and the upper FRTP 35, the lower FRTP 34 and the upper FRTP 35 are pressurized between the upper mold 32 and the lower mold 31 by lowering the upper mold 32. However, when the core 33 is placed in the concave portion formed in the lower FRTP 34, which has been formed by being depressed into the concave portion of the lower mold 31, and/or when the core 33 is covered with the upper FRTP 35 from above, voids are formed between the corner portions of the concave portion of the lower mold 31 and the lower FRTP 34 and/or between the core 33 and the lower and upper FRTPs 34 and 35.

When the heating and pressurizing is performed with the upper mold 32 and the lower mold 31 in the state where the voids remain, the lower FRTP 34 and the upper FRTP 35 cannot be sufficiently supported by the core 33 from the inside, and particularly, in a part of the lower FRTP 34 formed along the same direction as the vertical direction in which the upper mold 32 moves, that is, in a vertical part, a change in thickness occurs. Moreover, the shape of the outer surface of the lower FRTP 34 may not be formed into the shape that follows the shape of the corner portion of the concave portion of the lower mold 31, resulting in wrinkles which may appear in the outer surfaces, or in buckled shapes in the vertical direction. Or, the vertical part may be molded in a compressed state in which the length thereof is shorter than the specified length, resulting in the degradation of dimensional accuracy of products.

Particularly, when the lower FRTP 34 and the upper FRTP 35 are made of a long fiber reinforced resin material using long fibers, in a case where pressure molding is performed while voids are present between the core 33 and the lower and upper FRTPs 34 and 35 or between the upper and lower molds 32 and 31 and the lower and upper FRTPs 34 and 35, the fiber orientation of the long fibers is disordered and bends thereof occur, resulting in degradation of the strength as the fiber-reinforced plastic and deterioration of the appearance of the molded products.

These problems are described in more detail using FIGS. 13 and 14 which schematically illustrate the configuration of Conventional Example 1. In FIGS. 13 and 14 the above-mentioned vertical parts are denoted by reference numeral 37. The state in which an annular prepreg 36 having the core 33 disposed therein is accommodated in the concave portion formed in the lower mold 31 and in which the upper mold 32 has been lowered toward the lower mold 31 is illustrated in the FIGS. 13 and 14.

In FIG. 14, a configuration in which a reinforcing rib 39 at the center portion of the prepreg 36 is added to the configuration of the prepreg 36 illustrated in FIG. 13 is illustrated. Other configurations are the same as those of FIG. 13.

As illustrated in FIGS. 13 and 14, the prepreg 36 is interposed between the upper mold 32 and the lower mold 31 to be heated and pressurized, thereby molding a semi-finished product. In addition, holes are bored through the semi-finished product and a powder grain group included in the core 33 is discharged to the outside through the holes bored through the semi-finished product, thereby completing a hollow molded article.

However, in the case the core 33 is placed in the concave portion formed in the prepreg 36 accommodated in the lower mold 31, voids are easily formed between the outer surface of the core 33 and the inner circumferential surface of the prepreg 36, for example, in a case where the semi-finished product is to be shaped into a shape having angular portions. Particularly, when some space is provided between the mold and the prepreg 36 in order to smoothly insert the prepreg 36 into the mold, the space may cause voids between the corner portions of a molding surface and the prepreg 36.

Here, when the prepreg 36 is heated and pressurized by lowering the upper mold 32 toward the lower mold 31, winkles and bends may occur in the vertical part 37 of the prepreg 36 in the vertical direction due to the influence of the voids, and thus the angular portions of the outer surface side of the prepreg 36 may not be formed into a desired right-angled shape i.e. the prepreg 36 in the mold may remain to be not charged, resulting in the formation of voids between the molded product and the molding surface of the mold.

Particularly in the case the amount of the powder grain group included in the core 33 is small, voids may also be formed between the prepreg 36 and the core 33, and bends may occur in the vertical part 37 of the prepreg 36. In addition, as illustrated in FIGS. 13 and 14, a portion of the vertical part 37 is deformed into a shape that is curved toward the core 33. Moreover, in a case where the fluidity of the powder grain group included in the core 33 is low, the influence of the deformation becomes significant. Even if some portion of the vertical part 37 illustrated in FIG. 14 is not deformed to be curved toward the core 33, the vertical part 37 may be compressed making the length thereof shorter than the specified length.

Furthermore, as illustrated in FIG. 14, in a case of a configuration provided with the reinforcing rib 39, when the prepreg 36 is pressurized with the upper mold 32 and the lower mold 31, the rib 39 is deformed into a further curved shape due to the movement of the cores 33 on both sides. Then, in the deformed states as illustrated in FIGS. 13 and 14, the molded products become defective products.

In the invention described in Patent Document 1, in order not to produce defective products, enhancement of the precision in preforming the prepreg 36 and/or pre-forming of the core 33 into a desired shape is necessary so that no void is formed between the prepreg 36 and the core 33. However, configuring the core 33 by measuring the amount of powder grain group precisely to the required amount, forming the shape thereof into the desired shape, and then bringing the prepreg 36 into close contact with the core 33 to allow the shape of the external form of the prepreg 36 to follow the inner surface shape of the mold needs much time and effort due to the instability of the shape of the powder grain group that is not completely fixed and of the uncured prepreg.

In the inventions described in Patent Documents 2 and 3, the internal pressure of the core 43 or the chamber walls 55 and 55 may be increased by introducing the pressurized gas or liquid. The pressurized gas or liquid has a physical property in which pressures at an arbitrary point become the same pressure in all directions. Therefore, when a portion of the gas or liquid pressurized to increase to the internal pressure leaks from the core 43 or the chamber walls 55 and 55, the leaking gas or liquid becomes a high-speed and high-pressure jet stream and is ejected to the outside through the gap between the molds 41*a* and 41*b* or between the pressure chambers 51 and 52 while being in a high temperature state. In these cases, particularly in the case in which the liquid is ejected, the periphery of the mold or the pressure chambers may be significantly damaged or the safety of an operator may be damaged. Therefore, a facility considering sufficient safety measures is needed.

As described above, in the molding method and the molding device of the fiber-reinforced plastic having a closed cross-section or an open cross-section according to the related art represented by the inventions described in Patent Documents 1 to 3, although the heating and pressurizing methods vary, a pair of male and female molds (and/or pressure chambers) are used, and by moving one or both thereof in the pressurizing direction, the molding material such as the prepreg or the layup material interposed between the pair of molds is heated and pressurized.

However, as in the invention disclosed in Patent Documents 1 and 2 described above, typically, for example, a hydraulic cylinder which can bear a typically required internal pressure of the mold cavity is used in an operation of opening and closing the upper molds 32 and 41*b* which are movable, and thus the extension and retraction distances thereof are controlled to maintain the interval between the upper mold and the lower mold to be constant during the molding. However, due to the increase in the internal pressure of the core during the molding, it becomes difficult to maintain the position of the upper mold at a constant position against an increase in the pressing force by the prepreg on the inner surface of the upper mold, that is, it becomes difficult to maintain the interval between the upper mold and the lower mold to be constant. As a result, predetermined dimensions are not obtained for the molded products, and the dimensions of the products vary, resulting in a reduction in yield.

Furthermore, the manufacturing cost of the mold itself used for the molding is extremely high, and the mold has to be changed whenever the shape of the molded article is changed, which significantly affects the molding cost. In addition, particularly regarding the molded article having an open cross-section, in many cases, the inner surface side does not require excellent appearance and accuracy although the outer surface side requires excellent appearance and accuracy.

The present invention solves the above-described problems in the related art, and an object thereof is to provide a method for molding a fiber-reinforced plastic capable of uniformly increasing pressure applied to a prepreg (layup material) without using gas or liquid when a molded article having a closed cross-section or an open cross-section is molded using a molding die, preventing a portion of media constituting a core from leaking from the molding die even in a case where a pressure is applied to the core or where a typical molding die is used, and performing molding by using a typical molding die as a molding die on a side where a cavity having excellent appearance and accuracy is required and using a mold which can be shared and has a high degree of freedom in changing shapes as a mold on a side where a slight degradation of the appearance and accuracy is allowed.

Means for Solving Problem and Effect

The first basic configuration of a method for molding a molded article of fiber-reinforced plastic having a closed cross-section of the present invention is a method for molding the molded article of fiber-reinforced plastic including: forming a core having a desired shape by accommodating a grain group containing a plurality of high-rigidity grains in a flexible bag; disposing a prepreg containing a resin and fiber so as to wrap around the core; disposing the core and the prepreg wrapping around the core between an upper mold and a lower mold of a molding die; and performing compression molding by closing the molding die, wherein the method includes: holding the upper mold and the lower mold by mold interval holding means so as not to cause an interval therebetween to be increased; pressing a part of outer surfaces of the core, via the prepreg or not via the prepreg, to increase internal pressure of the core and deform the core by pressing means which comes into the cavity between the upper mold and the lower mold; and eliminating voids between the core and the prepreg by the pressing and the deformation of the core.

In this configuration, it is preferable that completely restricting an upward movement of the upper mold by moving the mold interval holding means disposed in left and right side portions of the upper mold by a predetermined amount in a direction in which the mold interval holding means approach each other be included. In addition, left and right side surfaces of the upper mold and abutting surfaces of the mold interval holding means may be formed as wedge-shaped sliding surfaces.

In addition, it is preferable that grain diameters of the grain group accommodated in the flexible bag be not uniform. Furthermore, regarding a molded product molded by compression molding, in which a portion of one of outer circumferential surfaces of the core is pressed, the part of the molded product through which the portion of the outer circumferential surface of the core was pressed may serve as a formation part of a discharge hole through which the grain group is discharged from the molded product. Appropriately, pressing the portion of one of outer surfaces of the core by inserting a rod into the cavity of the molding die is included, the rod is preferably a piston rod, and the grain group may well be discharged to outside of the molded product through the insertion position of the rod after the compression molding.

In addition, it is preferable that the grain group accommodated in the flexible bag include high rigidity grains, the grain group include a first grain group (a) and a second grain group (b) having different grain diameters, and the ratio $D_a/D_b$ of the diameter $D_a$ of the first grain group (a) to the diameter $D_b$ of the second grain group (b) be equal to or higher than 1.1 and equal to or less than 2.0. In addition, it is preferable that the ratio of the total amount of the second grain group (b) to the total amount of the grain group accommodated in the flexible bag be in a range of 20 to 60 mass %, and holding the upper mold and the lower mold by mold interval holding means so as not to cause the interval therebetween to be increased; pressing a portion of one of surfaces of the core to increase an internal pressure of the core and deform the core by pressing means which comes into and out of the cavity between the upper mold and the lower mold; and increasing cohesion between the prepreg, the molding die, and the core by the pressing and the deformation of the core may be included. In addition, the grain group preferably includes high rigidity grains of $\phi 0.1$ mm to φ10 mm, and particularly preferably includes high rigidity grains of φ0.5 mm to φ2 mm.

It is preferable that the flexural modulus of the high rigidity grain be equal to or higher than 50,000 MPa, and it is preferable that a ceramic grain be used as the high rigidity grain. It is preferable that the upper mold and the lower mold be held by mold interval holding means so as not to cause the interval therebetween to be increased, a portion of one of outer surfaces of the core be pressed to increase internal pressure of the core and deform the core by pressing means which comes into and out of the cavity between the upper mold and the lower mold, and cohesion between the prepreg, the molding die, and the core be increased by the pressing and the deformation of the core.

In addition, a method for molding a molded article of fiber-reinforced plastic of the present invention having the second basic configuration includes: using a molding device including: a one-sided mold having a molding surface that shapes the upper surface of the molded article; a deforming mold having a desired shape that accommodates grains containing a plurality of high-rigidity grains in a flexible bag; and a box shape housing having a floor surface portion, side wall portions that are erected along the circumferential edge portion of the floor surface portion, and an opening, wherein the method includes: interposing a prepreg containing a resin and fiber between the one-sided mold and the deforming mold disposing in the opening; fitting the one-sided mold tightly into the opening and closing them; performing compression molding by applying the pressing force to the one-sided mold and pressing the prepreg between the one-sided mold and the deforming mold with a pressing force; and molding one side surface of the prepreg by using the one-sided mold during the pressing and molding the surface of the prepreg on the opposite side by deforming the deforming mold to follow a shape of the molding surface according to flow of the grains in the deforming mold.

In the method for molding a fiber-reinforced plastic, preferably, the grain group in the deforming mold may be heated in advance before the molding. In addition, locally pressing a portion of an outer circumferential surface of the deforming mold by auxiliary pressing means in addition to the pressing by the one-sided mold may be included, and it is preferable that the auxiliary pressing means include a rod which is able to come in and out of the cavity facing to the one-sided mold, and the portion of the outer circumferential surface of the deforming mold be pressed and deformed by the rod. In addition, it is preferable that the grain group be made of metallic grains of φ0.1 mm to φ10 mm.

In addition, the method for molding a fiber-reinforced plastic is efficiently performed by the molding device described as follows.

That is, the basic configuration of the molding device of a fiber-reinforced plastic includes: the one-sided mold described above; the deforming mold; a housing in which the deforming mold is accommodated and placed including a floor surface portion, an opening surface portion disposed to oppose the floor surface portion at an appropriate distance, and a side wall portion disposed between the floor surface portion and the opening surface portion; and first pressing means for pressing the one-sided mold against the deforming mold with a required pressing force, wherein the one-sided mold has a mold base portion and a tight fitting portion which is tightly fitted into the opening surface portion of the housing to slide therein, and the molding surface of the tight fitting portion which opposes the floor surface portion has the cavity facing to the molding surface.

Here, it is preferable that the grain group be made of metallic grains of φ0.1 mm to φ10 mm, and it is preferable that the housing include second pressing means which advances toward and retreats from the deforming mold accommodated therein to locally press and deform the deforming mold.

According to the first basic configuration of the present invention, a core having a desired shape by accommodating grain group containing the plurality of grains in a flexible bag is used. And, during the compression molding with the molding die, a portion of one of outer surfaces of the core is pressed via the prepreg or not via the prepreg to form a dent in the outer surface of the core and forcibly increase the internal pressure of the core. In addition, by increasing the internal pressure of the core, the grains constituting the core are allowed to slip on each other, and thus the core is deformed. By using the grains having fluidity as the grain group included in the core, when the dent is formed in the outer surface and the internal pressure of the core is increased by pressing the outer surface of the core, the grains constituting the grain group move and thus the fluidity and the pressure transmission of the grain group in the core are enhanced. In addition, when the dent is formed in the one of the outer surfaces of the core by pressing the outer surface the internal pressure of the core is increased and the grains constituting the grain group move, and simultaneously pressure during the compression molding is increased, thereby obtaining a molded article having excellent shape and dimensional accuracy.

In addition, since the core is deformed, even if voids are present between the prepreg and the core when the core is wrapped with the prepreg, the voids can be reliably filled by the deformation of the core. In addition, particularly, even when voids are formed between the corner portion of the molding surface of the molding die and the prepreg, the prepreg can be moved in a direction in which the voids are filled by the deformation of the core. Accordingly, the voids can be filled.

The voids formed between the prepreg and the core are crushed by a high internal pressure of the core due to the deformation of the core and air filling the voids is discharged to the atmosphere from inside of the molding die through the prepreg. Passages formed by the air that passes through the prepreg may be naturally filled by the melted prepreg after the air passes.

The core is configured by accommodating a large number of grains in the flexible bag. Therefore, even when the core is deformed by pressing a portion of one of the outer surfaces of the core and forming a dent in the outer surface, the internal pressure of the core is not usually in a uniform pressure state in all portions as in the case where liquid or gas is used. That is, even when a pressure is applied to the grain group, a pressure that is lower than the pressure in the part to which the pressure is applied is generated in the other portions. Here, when the applied pressure is higher than a certain value, the grains constituting the grain group slip on each other.

Therefore, when the outer surface of the core is pressed, even in a case where the internal pressure of the portion of the outer surface of the core where the dent is formed by the pressing is significantly increased, an increase in pressures of the position on the outer surface side of the core distant from the portion becomes lower than that in the internal pressure of the portion where the dent is formed. Particularly, the transmission of the pressure and the fluidity of the grain group in the core are affected by the surface roughness of the grains constituting the grain group, the grain diameter, and the rigidity of the grains. When a grain group constituted by grains having uniform grain diameter and having the same rigidity is used, the grains constituting the grain group are packed at the highest density in the core and thus the fluidity of the grains constituting the grain group is degraded, resulting in the degradation of the transmission of the pressure. Therefore, by considering the distribution of the grain diameters and the distribution of the surface roughness of the grains in the core or by using a grain group in which high-rigidity grains are combined with grains having a different rigidity, for example, grains of a thermoplastic resin, the fluidity of the grains constituting grain group and the pressure transmission in the core are enhanced.

When the fluidity and the pressure transmission are enhanced as such, even in a part of the core distant from the portion where the dent is formed by the pressing, the core is deformed by the slip between the grains constituting the grain group. Accordingly, the prepreg can be pressed along the molding surface of the molding die, and for example, the pressure between the portion of the core that supports the vertical part described above and the prepreg can be increased. Accordingly, bending and deformation of the vertical part as described above can be reliably prevented during the pressurization between the upper mold and the lower mold.

In the molding method of the present invention, it is preferable that as the grain group accommodated in the core, high-rigidity grains having fluidity be singly used or grains including the high-rigidity grains and resin grains be used.

As the high-rigidity grains, grains made of materials having flexural modulus of 50,000 MPa or higher including ceramics such as alumina and zirconia, glass, a hard heat-resistant resin, metal, foundry sand, and the like may be used. Particularly, in a case where ceramics made of zirconia or quartz are used, these materials are appropriate materials as the grains constituting the grain group of the core 4 due to their low thermal conductivity.

As the resin grains, various types of thermoplastic resins including polyolefin such as polypropylene and polyethylene, acrylic resins, nylon, and Teflon (registered trademark) and various elastomers such as silicone may be used. Particularly, in a case where a thermoplastic resin having a flexural modulus of 10 to 3000 MPa is used, the fluidity and the transmission of the rigid grains are enhanced, and thus the thermoplastic resin is an appropriate material used in the grain group of the core.

In a case using the high-rigidity grains having fluidity and the resin grains as the grain group included in the core, increase in the internal pressure of the core by forming a dent in one of the outer surfaces of the core causes the grains constituting the grain group to slip on each other as the resin grains are elastically deformed, and thus the high-rigidity grains are moved. Accordingly, the fluidity and the pressure transmission of the grain group in the core are enhanced. In addition, regarding the resin grains, since the dent is formed in the outer surface and the internal pressure of the core is increased by pressing a portion of the outer surface of the core, the high-rigidity grains are moved, and the grains constituting the grain group are moved, and the resin grains are crushed by plastic deformation by increasing the pressure during the compression molding, thereby obtaining a molded article having excellent shape and dimensional accuracy.

Moreover, by fixing the closed position of the molding die by the mold interval holding means to cause the length of the above-mentioned vertical part in the vertical direction to be a specified length the high pressure between the outer surface of the core and the inner surface of the prepreg can be maintained. Accordingly, a situation in which the length of the above-mentioned vertical part in the vertical direction is vertically compressed and shortened to be smaller than the predetermined length can be avoided, and the prepreg can be molded into a desired thickness.

In addition, even in a case where the angular portion of the outer surface of the prepreg is formed as, for example, an angular portion at a right angle, a sufficient amount of the prepreg can be moved to the corner portion of the molding die which molds the angular portion, so that the angular portion of the outer surface of the prepreg at right angle or the like can be reliably molded.

When the internal pressure of the core is increased, the grains constituting the grain group slip and move in all directions. However, the flexible bag accommodating the grain group is made of an extendible material. Therefore, due to the extendible flexible bag, the deformation of the outer shape of the core due to the movement of the grains constituting the grain group can be allowed. When the pressing force of the grain group in the bag on the flexible bag of the core is increased by the fastening of the molding die or the pressing to form a dent, if the bag does not have a sufficient strength for holding the grain group against the pressure, there may be cases where the grain group breaks the bag. However, when the open gap of the molding die is smaller than the diameter of the grain, the grains do not leak from the molding die as long as the grains are not crushed.

As means for pressing a portion of one of the outer surfaces of the core, a rod which is able to come in and out of the molding surface of the molding die may be used. In a case where the rod which is able to come in and out of the molding surface of the molding die is used, for example, a piston rod may be used as the rod, and such pressing means may be provided in a plurality of parts.

In the present invention, when the outer surface of the core is pressed, a portion of the outer surface of the core may be pressed via the prepreg or not via the prepreg. In a case where a part having a substantially flat shape is pressed via the prepreg, a concave portion is formed in the prepreg. In a case where a convex part is pressed via the prepreg, the prepreg becomes flattened. In the concave portion or the flattened portion as the pressed part, or in a portion other than the pressed part, a discharge hole for discharging the grain group included in the core from the molded product may be provided.

In addition, in a case where the portion of the outer surface of the core is pressed not via the prepreg, a hole having the shape corresponding to the cross-sectional shape of the pressing portion of the pressing rod are bored through the prepreg and the core is directly pressed by the rod after molding a semi-molded product. The flexible bag may be broken from the hole positions of the molded product to discharge the grains, and the flexible bag may be released. The flexible bag is subjected to a releasing treatment such as applying a release agent or is doubly packaged, thereby removing the flexible bag in contact with the grains from the semi-finished product is easy.

In addition, according to another preferable aspect of the present invention, the upper mold and the lower mold may be held by the mold interval holding means so as not to cause the interval therebetween to be increased during clamping or pressure molding using the molding die. Disposing the mold interval holding means in left and right side portions of the upper mold; and completely restricting an upward movement of the upper mold by moving the mold interval holding means disposed in the left and right side portions of the upper mold by a predetermined amount in a direction in which the mold interval holding means approach each other are included. It is preferable that the left and right side surfaces of the upper mold and the abutting surfaces of the mold interval holding means be formed as mutually corresponding wedge-shaped sliding surfaces.

During the clamping or the pressure molding by the molding die, the pressing force of the prepreg applied on the molding surface is increased. However, according to this aspect, when the pair of left and right mold interval holding means are horizontally moved by a predetermined distance in a direction in which the mold interval holding means approach each other, the mold interval holding means abut on the upper mold partway, and a further movement of the upper mold in the upward direction is impeded. Accordingly, the interval between the upper mold and the lower mold in the above-described vertical part is maintained in a specified distance. By fixing the clamping position of the molding die as such, an increase in the pressing force between the outer circumferential surface of the core and the inner surface of the prepreg is secured. Accordingly, a situation in which the length of the above-mentioned vertical part in the vertical direction is compressed and shortened to be smaller than a predetermined length can be avoided, and the prepreg can be molded into a desired thickness. At this time, when the upward and downward movements of the upper mold are controlled only by a hydraulic cylinder without the mold interval holding means, an increase in pressure due to the extension of the core becomes higher than a specified level and the upper mold is moved upward against the cylinder. Accordingly, the interval between the upper and lower molds is increased and a product having a larger height than a specified dimension is manufactured.

In addition, as an appropriate example of the mold interval holding means, wedge surfaces are preferably employed. According to a specific aspect, the upper end shoulder portions of the left and right side surfaces of the upper mold are formed as downward sloped surfaces directed outward and the lower end angular portions of the opposing surfaces of a pair of left and right mold interval holding means are formed as downward sloped surfaces directed outward similarly. For example, when the mold interval holding means are horizontally moved in the direction in which they approach each other to allow the opposing sloped surfaces of the upper mold and the mold interval holding means to abut each other and the left and right mold interval holding means are further moved in the direction in which they approach each other, the sloped surfaces of the mold interval holding means press the sloped surfaces of the upper mold by the movement amount and moves the upper mold downward. Here, when the left and right mold interval holding means are fixed, the upward movement limit position of the upper mold is determined and thus a further movement of the upper mold in the upward direction is restricted. Therefore, even when the pressing force of the core applied to the molding surface of the upper mold via the prepreg is increased, the movement limit position of the upper mold is maintained.

The present invention may employ the above-described second basic configuration, and particularly, a configuration that is the most characteristic in which, among male and female molds in the related art, as one of the molds, a mold (referred to as an one-sided mold) which has rigidity as in the related art is used, and as the other, a deformable deforming mold is used which accommodates a large number of grains having high fluidity in a bag having sufficient flexibility in a sealed state. In this case, a housing which supports the deforming mold allowing the deforming mold to deform is prepared. In the following description, in the present invention having the second basic configuration, a mold in which the one-sided mold is the upper mold and the deforming mold is the lower mold is described as a representative example.

In order to mold a fiber-reinforced plastic using the mold having the above configuration, first, the housing is set to be heated and the deforming mold is placed in the floor surface portion of the housing. At this time, the grains accommodated in the flexible bag of the deforming mold may be heated to 100° C. to 200° C. in advance along with the bag. Next, a prepreg made by impregnating a single layer or laminated layers of fiber aggregation with a matrix resin is placed on the deforming mold. Subsequently, the one-sided mold is tightly fitted into the opening of the housing to allow the molding surface of the one-sided mold having a required shape formed therein to face the prepreg, and is pressed and moved with a required load applied in a direction in which the prepreg is pressed.

During the pressing and the movement, the surface of the prepreg on the one-sided mold side is shaped into a predetermined shape under a large pressing force of the molding surface of the mold. At the same time, in the deforming mold disposed on the surface of the prepreg on the opposite side to the one-sided mold, the flexible bag included in the deforming mold is confined by the floor surface portion and the side wall portion of the housing. Particularly on the floor surface, the deforming mold is widened over the entire surface, and further deformation is not made on the floor surface. On the other hand, on the surface of the deforming mold on the side that faces the prepreg, reaction force from the floor surface portion causes the grains in the bag to move and the bag to be deformed following the deformation of the prepreg. The deformation at this time is achieved by the grains therein that automatically flow in directions in which the internal stress of the prepreg is uniformized In the final stage, the surface of the prepreg on the one-sided mold side also receives reaction force of the deforming mold disposed on the opposite side to the one-sided mold and is thus shaped into the shape of the mold, while the surface on the opposite side in contact with the deforming mold is deformed by following the deformation of the entire surface of the prepreg on the mold side. Accordingly, all clearance space between the deforming mold and the prepreg are filled by the deformation of the deforming mold and are shaped into a shape corresponding to the uniform stress in the prepreg that occurs between the one-sided mold and the deforming mold.

After a predetermined number of molded articles having desired shapes are manufactured in this manner, there is a changeover to manufacturing new molded articles having different shapes and structures. At this time, first, a new one-sided mold is prepared and the one-sided mold used before is detached from the molding machine to be replaced with the new one-sided mold. In the changeover, the replacement of the deforming mold is unnecessary. That is, the deforming mold is not replaced but is used as it is during the subsequent moldings. As described above, in the present invention, when only the one-sided mold is replaced among the pair of molds, subsequent molded articles having new shapes and structures can be molded. During the changeover of the molding, there is no need to prepare a pair of molds provided with new shapes needed in a conventional method. By preparing only a single one-sided mold, it becomes possible to mold a fiber-reinforced plastic molded article having an open cross-section with a new shape and a structure.

As a result, the manufacturing cost of the molds required for molding is reduced, and the cost of the molded article can be significantly reduced. Furthermore, during the pressure molding, on the opposite surface of the prepreg to the surface of the one-sided mold side, grains in the deforming mold freely flow due to external force (pressing force) and thus a necessary and sufficient pressing force can be exerted uniformly on every part of the surface. Moreover, even in a case the internal pressure of the deforming mold is increased by using auxiliary pressing means, for example, a rod material to be locally operated on a portion of the deforming mold, since surface pressure is always applied to the prepreg, the direction of the fiber included in the prepreg is not affected, and the manufacturing of a high-quality product is always guaranteed during molding of this type of fiber-reinforced plastic article which focuses on fiber direction.

MODES FOR CARRYING OUT THE INVENTION

Hereinafter, exemplary embodiments of the invention will be described in detail with reference to the accompanying drawings. Regarding a method for molding a fiber-reinforced plastic related to the present invention, the present invention can be appropriately applied to other configurations that can widen the outer circumferential surface area of the core during pressure molding by the molding die, as well as configurations of molds and cores described below.

EXAMPLES

Figure 1:
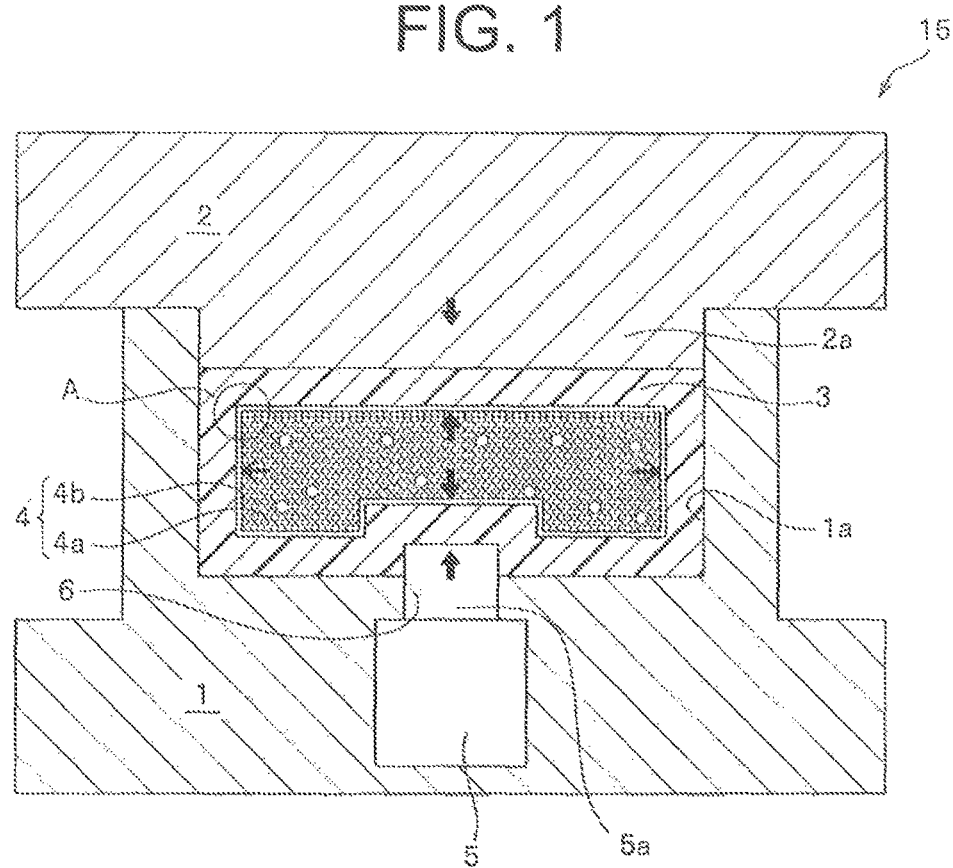
FIG. 1 is a schematic view illustrating pressure molding of the present invention having a first basic configuration.

As illustrated in FIG. 1, a preform which includes a core 4 therein obtained by shaping a prepreg 3 into a shape that is substantially the same as the inner circumferential surface shape of a molding die 15 at room temperature is placed in a concave portion 1a formed in a lower mold 1 of the molding die 15 heated in advance.

The prepreg 3 may be made as a sheet-like material by impregnating fibers such as carbon fiber, glass fiber, aramid fiber, or silicon carbide fiber with an uncured thermosetting resin. In the illustrated example, the prepreg 3 is formed to have an annular cross-sectional shape and the core 4 is included therein. For example, the prepreg 3 can be configured as the illustrated example by wrapping the core 4 with two sheets of prepreg.

Then, the prepreg 3 which is in a molten state by heating from the molding die 15 is cured by pressure molding in the molding die 15, thereby manufacturing a fiber-reinforced plastic (FRP) molded article having a desired shape. In a case of impregnating a thermoplastic resin instead of the thermosetting resin, the preform obtained by shaping the prepreg 3 heated in advance is subjected to pressure molding in the molding mold and is cooled to manufacture an FRP molded article having a desired shape.

As the thermosetting resin impregnated in the fibers, epoxy resins, urea resins, vinylester resins, unsaturated polyesters, polyurethanes, phenolic resins, and the like may be used. As the thermoplastic resin, polypropylene, polyethylene, polystyrene, vinyl chloride, polyamide, and the like may be used.

The core 4 is configured by accommodating a grain group 4a in a flexible bag 4b.

As high-rigidity grains, grains made of materials having a flexural modulus of 50,000 MPa or higher, including ceramics such as alumina and zirconia, glass, a hard heat-resistant resin, metal, foundry sand, and the like may be used. Particularly, in a case where ceramics made of zirconia or quartz are used, these materials are appropriate materials as the grains constituting the grain group 4a of the core 4 due to their low thermal conductivity.

As the flexible bag 4b used to hold the shape of the core 4, a film made of nylon, a film made of polyethylene, a fluororesin film, silicone rubber, and the like may be used.

In addition, as the grain group 4a of the core 4, grains (a) and (b) having a ratio of grain diameters that satisfies the following Expression (1) are used. At this time, when the ratio of the total amount of the grains (b) included in the grain group 4a is in a range of 20 to 60 mass %, the fluidity and the pressure transmission of the grain group 4a are enhanced, and thus an appropriate grain group configuration is achieved.

$$1.1 \leq (Da/Db) \leq 2.0, \quad (1)$$

where Da is the diameter of the grain of the grains (a), and Db is the diameter of the grain of the grains (b).

In the lower mold 1, a cylinder 5 having a piston rod 5a which is able to come in and out of the cavity of the molding die 15 is provided. In addition, in FIG. 1, the illustration of a pipe through which an operating fluid is supplied to and discharged from the pressure chamber of the cylinder 5 to allow the piston rod 5a to slidably move is omitted.

First, an upper mold 2 and the lower mold 1 are moved in a direction in which they approach each other and are completely closed to each other so that the prepreg 3 placed in the concave portion 1a of the lower mold 1 is heated and cured under the pressurization. The pressure in this stage is not high and the pressure is increased by the piston rod in the subsequent stage. Therefore, a mold opening and closing mechanism need not to be a high-pressure press machine.

Figure 2:
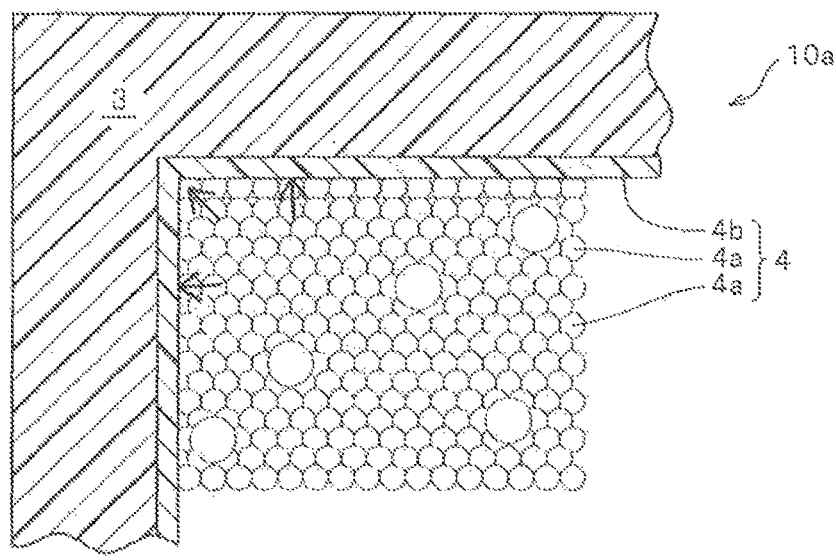
FIG. 2 is a schematic view illustrating the internal structure of a prepreg and a core in the above invention.

At this time, by allowing the piston rod 5a to protrude into the cavity of the molding die 15, a portion of one of the outer surfaces of the core 4 housed in the prepreg 3 is pressed. By the pressing, as illustrated in FIG. 2 which is an enlarged view of a part A surrounded by a circle of FIG. 1, the fluidity of the grain group 4a having a grain configuration in which grains having different grain diameters are combined as described above is enhanced, and a slip occurs in the grain group 4a in the core 4. As the grain group 4a slips, the core 4 increases in the outer circumferential surface area and can be brought into close contact with the inner surface of the prepreg 3 at the four corners of the inner surface of the prepreg 3 where voids are particularly likely to occur and in a region along the inner surface of the vertical part formed along the wall surface of the concave portion 1a. Therefore, molding can be performed without bends or wrinkles, thereby obtaining a molded article having high dimensional accuracy.

Even when voids are formed between the prepreg 3 that wraps the core 4 therein and the core 4, the internal pressure increases as the outer circumferential surface area of the core 4 is increased. Accordingly, air in the voids is pressurized at a high internal pressure by the core or is discharged to the atmosphere from the molding die 15 through the prepreg 3. Passages formed by the air that passes through the prepreg 3 may be naturally filled by the melted prepreg 3 after the air passes.

In addition, even in a case where voids are present between the molding die 15 and the prepreg 3 in the angular portions of the molding die 15, the prepreg 3 is deformed and moved toward the voids by the pressing by the core 4 of which the outer surface shape is widened. In addition, air in the voids is crushed by the high internal pressure or is extruded into the atmosphere from the molding die 15. The prepreg 3 moves to parts of the voids from which air is extruded and is formed into a shape that follows the angular portion shape of the molding die 15. Accordingly, the molded product formed by heating and pressurizing the prepreg 3 can be a molded article in which the angular portion is properly formed, for example, at a right angle.

In addition, in the drawings used for the description of the embodiment, for ease of understanding of the flexible bag 4b, the thickness of the flexible bag 4b is illustrated to be large in an exaggerated state. Actually, the flexible bag 4b is formed in a thin film having a thickness of 1 mm or less. Here, a configuration in which the molded product having an angular pipe shape is molded is described. However, the molded product may be molded into various different complex shapes having closed cross-sections.

As a shape similar to the closed cross-section, there is a shape having a C-shaped cross-section or the like. For example, in a case where a molded product having a C-shaped cross-section is to be formed, a configuration may be employed in which a portion of the core is allowed to directly abut on the molding surface of the upper mold 2 or the lower mold 1. In addition, the periphery of the core on which the core does not abut on the molding surface is covered with the prepreg 3, thereby molding a molded product having a C-shaped cross-section. Therefore, regarding the closed cross-section in the present invention, in addition to a shape such as an angular pipe shape, for example, a C-shaped cross-section is also included in the closed cross-section in the present invention.

As illustrated in FIG. 1, as a portion of one of the outer surfaces of the core 4 is pressed by a piston rod 5a, a concave portion 6 is formed in the outer surface of the prepreg 3. When the outer surface of the core 4 is pressed by the piston rod 5a, the volume of the core 4 is in a state in which the volume of the protruding piston rod 5a is forcibly added to the volume of the grain group 4a. As a result, the internal pressure of the core 4 can be increased.

As the internal pressure of the core 4 is increased, grains of the grain group 4a slip and move in all directions. However, since the flexible bag 4b accommodating the grain group 4a therein is made of an easily deformable material such as a vacuum packaging material, the flexible bag 4b can be extended without substantially limiting the movement of the grain group 4a. As described above, since the grains constituting the grain group 4a are allowed to slip by increasing the internal pressure of the core 4, the outer surface area of the core 4 can be enlarged. Accordingly, as illustrated in FIG. 2, voids between the core 4 and the prepreg 3 can be eliminated.

Moreover, since the enlargement of the outer surface shape of the core 4 occurs in a part in which the pressure between the core 4 and the prepreg 3 is low and where voids are likely to occur, the thickness of the prepreg 3 can be maintained in a predetermined thickness while eliminating the voids.

By compressing the prepreg 3 using the molding die 15 as described above, a semi-finished product of the prepreg 3 which has predetermined thickness and desired outer surface shape and accommodates the core therein is pressure-molded.

Figure 3:
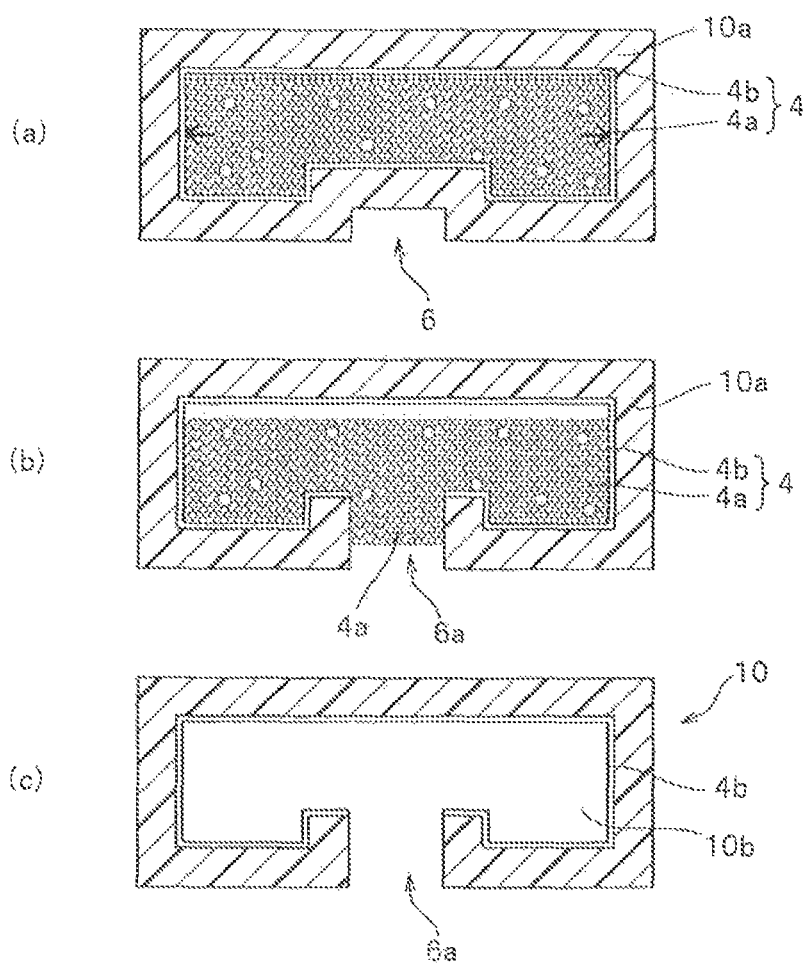
FIGS. 3(a)-3(c) are schematic views illustrating each stage for manufacturing a molded product having a hollow portion.

FIG. 3(*a*) illustrates a state where the semi-finished product 10a which is pressure-molded using the molding die 15 is taken out from the molding die 15. The concave portion 6 is formed in the portion of the prepreg 3 pressed by the piston rod 5a.

As illustrated in FIG. 3(*b*), when a discharge hole 6a is bored through the concave portion 6, air infiltrates through of the grain group 4a made of the grains (a) and (b) accommodated in the flexible bag 4b from the hole 6a and the binding situation of the grains constituting the grain group 4a is collapsed. In addition, the grain group 4a of which the binding situation is collapsed is discharged to the outside through the discharge hole 6a formed in the concave portion 6, thereby completing a molded product 10 having a hollow portion 10b as illustrated in FIG. 3(*c*). When the flexible bag 4b which accommodated the grain group 4a is made of a material with good releasability from the molded product 10 or the flexible bag 4b is doubly configured, the flexible bag 4b that in contact with the grain group 4a can be detached from the molded product 10.

As described above, since pressure-molding can be performed on the prepreg 3 in a state where no voids occur between the core 4 and the prepreg 3, as the molded product 10, an article having desired outer surface shape with desired thickness without bends or wrinkles can be manufactured. In addition, even in a case where the internal pressure of the core 4 is low in a state where the molding die 15 is closed, the internal pressure of the core 4 can be increased by the pressing force applied by the piston rod 5a, and thus a product having desired outer surface shape with desired thickness can be manufactured as the molded product 10.

(Evaluation of Fluidity of Grain Group)

The evaluation of the fluidity of the grain group 4a included in the core 4 was performed by the following method.

First, regarding the fluidity of the grain group 4a, a mold in which a plate shape cavity 30 mm thick, 300 mm long, and 100 mm wide is provided and in which the pressure of the outer surface of the core can be measured at positions of (1) the center of the molded plate, (2) 65 mm from the center in the lengthwise direction, and (3) 130 mm from the center in the lengthwise direction is used. A predetermined amount of sample is charged into the center of the mold cavity while keeping the mold temperature at 140° C., and the mold is quickly closed, and the molding pressure is kept at 1.5 MPa. Subsequently, a portion of the outer surface of the core at the center of the cavity is pressed in by 10 mm at 8.0 MPa with a piston rod having a diameter of 38 mm, and is further pressed to increase the molding pressure to 5.0 MPa. The pressure change in the sample is recorded, and after a pressure peak is observed, the measurement is ended, The fluidity of the grain group 4a obtained were evaluated according to the following criteria regarding each of the examples:

Regarding respective peak values of the surface pressure measured at the three points of (1) the center, (2) 65 mm from the center in the lengthwise direction, and (3) 130 mm from the center in the lengthwise direction in the mold in which the pressure of the outer surface of the core 4 can be measured, ◯: The distributed range of the peak values of the surface pressure at the three points was equal to or less than 10% and the internal pressure was uniformly applied;

×: The distributed range of the peak values of the surface pressure at the three points was equal to or more than 10% and the internal pressure was not uniformly applied.

(Evaluation of Appearance of Molded Product)

The appearance of a hollow molded product obtained in each of the examples was visually evaluated according to the following criteria.

◯: Defects such as wrinkles were not present on the outer surface of the molded product and the appearance was good.

33 : Defects such as wrinkles were present on the outer surface of the molded product and the appearance was poor.

Hereinafter, the present invention having the first basic configuration will be described in detail with reference to the drawings.

Example 1

As illustrated in FIG. 1, a core was manufactured by accommodating a grain group which contained a mixture of zirconia grains (grains (a) having a diameter of 3 mm and grains (b) having a diameter of 2 mm) having the ratio of grain diameters equal to 1.5 and including 20 mass % of grains (b) as the ratio of the total amount of the grains (b) included in the mixture of zirconia grains (the mixing ratio of the grains (b)), in a bag made of a nylon film. The core was wrapped in five plies of prepreg 3 of a carbon fiber-reinforced epoxy resin (product name: TR3110 391IMU, made by Mitsubishi Rayon Co., Ltd.) to make a preform having substantially the same shape as the inner circumferential surface shape of the molding die 15 at room temperature. The preform was placed in the concave portion 1a formed in the molding surface of the lower mold 1 of the molding die 15 heated to 140° C. in advance, and the upper mold 2 and the lower mold 1 were completely closed. Subsequently, a portion of one of the outer surfaces of the core 4 was pressed by the piston rod 5a at 8.0 MPa. After 10 minutes, the mold was opened to take out the semi-finished product. A discharge hole was bored through the concave portion 6 (FIG. 3(a)) formed by the pressing by the piston rod, and the zirconia grains (the grain group 4a) were discharged to the outside through the discharge hole (FIG. 3(b)), thereby obtaining the hollow molded article (FIG. 3(C)).

Examples 2 to 4

Hollow molded articles (FIG. 3(c)) were obtained in the same manner as Example 1 except that the mixing ratios of the zirconia grains (b) included in the grain group 4a of the core 4 were as shown in Table 1.

Comparative Example 1

A hollow molded article (FIG. 3(c)) was obtained in the same manner as Example 1 except that the mixing ratio of the zirconia grains (b) included in the grain group 4a of the core 4 was 10 mass % as shown in Table 1.

Comparative Example 2

A hollow molded article (FIG. 3(c)) was obtained in the same manner as Example 1 except that zirconia grains whose diameters were uniform were used as the grain group 4a of the core 4 as shown in Table 1.

TABLE 1

|  |  | Example 1 | Example 2 | Example 3 | Example 4 | Comparative Example 1 | Comparative Example 2 |
|---|---|---|---|---|---|---|---|
| Grain diameter | Da (mm) | 3.0 | 3.0 | 3.0 | 3.0 | 3.0 | — |
|  | Db (mm) | 2.0 | 2.0 | 2.0 | 2.0 | 2.0 | 2.0 |
| Ratio of grain diameters | (Da/Db) | 1.5 | 1.5 | 1.5 | 1.5 | 1.5 | 1.0 |
| Mixing ratio of grains (b) | Mass % | 20.0 | 33.0 | 40.0 | 50.0 | 10.0 | 100 |

TABLE 1-continued

|  | Example 1 | Example 2 | Example 3 | Example 4 | Comparative Example 1 | Comparative Example 2 |
|---|---|---|---|---|---|---|
| Fluidity of grain group | ○ | ○ | ○ | ○ | × | × |
| Appearance of molded product | ○ | ○ | ○ | ○ | × | × |

As shown in Table 1, in the manufacturing method according to Examples 1 to 4 in which the zirconia grains were used as the grains constituting the grain group 4a of the core 4, the ratio of the diameter Da of the first grain group (a) to the diameter Db of the second grain group (b) (expressed as Da/Db) was 1.5, and the grain group in which the ratio of the total amount of the second grain group (b) to the total amount of the grain group 4a was 20 to 50 mass % was used, the fluidity and the pressure transmission of the grain group 4a were enhanced, the dimensional accuracy of the obtained molded articles was high, and the appearance was excellent without defects such as wrinkles on the outer surface.

On the other hand, in the manufacturing method according to Comparative Example 1 in which the zirconia grains were used as the grains constituting the grain group 4a of the core 4, the ratio of the diameter Da of the first grain group (a) to the diameter Db of the second grain group (b) (expressed as Da/Db) was 1.5, and the grain group in which the ratio of the total amount of the second grain group (b) to the total amount of the grain group 4a was 10 mass % was used, and Comparative Example 2 in which the zirconia grains whose diameters were uniform were used, the grains constituting the grain group 4a were packed at the highest density, the fluidity of the grains constituting the grain group was degraded and thus the pressure transmission was damaged. Accordingly, the dimensional accuracy of the obtained molded articles was degraded, and defects such as wrinkles were present on the outer surface and thus excellent appearance could not be obtained.

Hereinafter, modification examples of the present invention will be described in detail with reference to the drawings. Here, according to the modification examples described below, the interval between the upper mold and the lower mold is not increased but is held at a constant interval during molding, and thus the core can be deformed at a required pressure. However, the method for molding a fiber-reinforced plastic according to the present invention is not limited to the modification examples.

Modification Example 1

Figure 4:
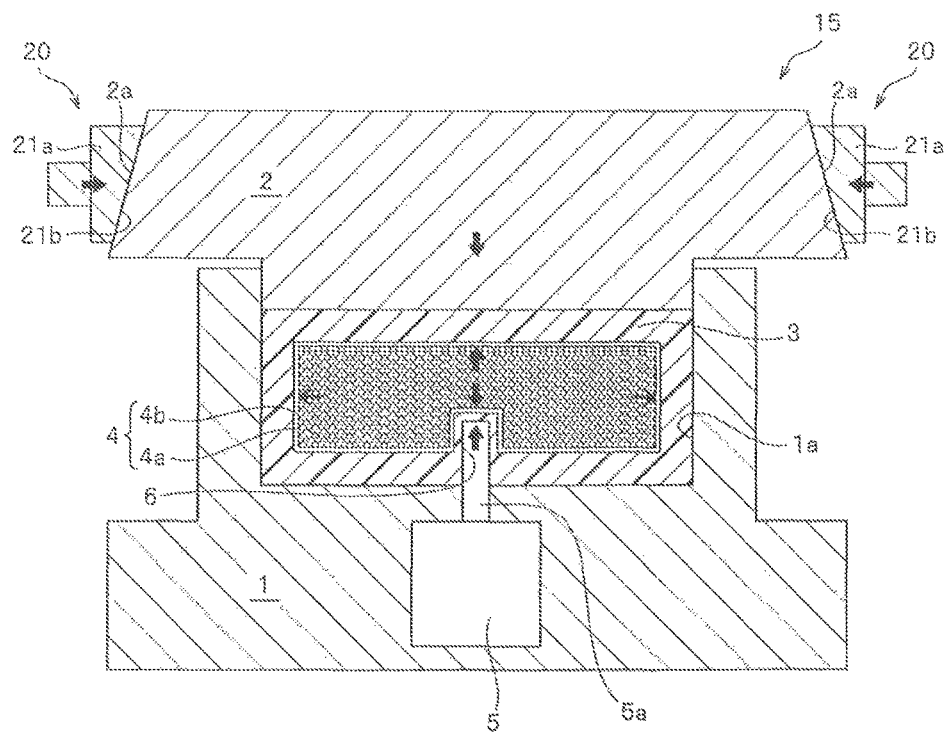
FIG. 4 is a schematic view illustrating another embodiment of the above invention during pressure molding.

While the upper mold 2 and the lower mold 1 are in a state of being closed to each other, or while the prepreg 3 is in a pressurized state of being pressurized by the upper mold 2 and the lower mold 1 at a predetermined pressure, the interval between the upper mold 2 and the lower mold 1 should not increase any more. Therefore, according to the illustrated examples, mold interval holding means 20 for maintaining the interval between the upper and lower molds 2 and 1 in a constant level are provided in the upper mold 2. As illustrated in FIG. 4, as the mold interval holding means 20, a configuration is employed in which the upper mold 2 is not raised by an increase in the pressing force to the upper mold 2 due to the deformation of the prepreg 3 even when the core 4 is pressed and deformed by the piston rod 5a.

In the example illustrated in FIGS. 4 and 7(A), the mold interval holding means 20 include wedge surfaces 21b and 21b which comes in sliding contact with downward sloped surfaces 2a and 2a formed in the upper end portions of the left and right side surfaces (left and right upper end shoulder portions of FIG. 4) of the upper mold 2, a pair of left and right pressing members 21a and 21a which are slidably movable in the direction (horizontal direction) perpendicular to the movement direction of the upper mold 2 (vertical direction), and a driving unit (not illustrated) which drives the pressing members 21a and 21a in a direction in which they are driven near to and away from each other by moving them in the horizontal direction. The wedge surfaces 21b and 21b of the pair of left and right pressing members 21a and 21a which oppose each other have shapes in which the interval between the facing wedge surfaces 21b and 21b increases downward as illustrated in FIG. 7(A).

In the closed state or in the pressurized state by the upper mold 2 and the lower mold 1, the pair of pressing members 21a and 21a are horizontally moved to approach the downward sloped surfaces formed in the upper end portions of the left and right side surfaces of the upper mold 2 such that a wedging action is performed by the downward sloped surfaces 21a and 21a formed in the upper end portions of the left and right side surfaces of the upper mold 2 and the wedge surfaces 21b and 21b. Here, the separation distance between the upper and lower molding surfaces of the upper and lower molds 2 and 1 is determined by movement stop positions of the pressing members 21a and 21a in the left and right direction, so that a further movement of the upper mold 2 in the upward direction is impeded. That is, since the interval between the upper mold 2 and the lower mold 1 is determined by the movement stop positions of the pressing members 21a and 21a, the interval between the upper mold 2 and the lower mold 1 can be arbitrarily adjusted by adjusting the stop positions. When the stop positions are determined, even when a great force is exerted on the upper mold 2 from below, the upper mold 2 is maintained in an immovable state and the immovable position is reliably held, thereby obtaining a molded product having high dimensional accuracy.

Next, the pressing effect by the piston rod 5a will be described under the following hypothetical condition.

For example, it is assumed that a pressing surface of the upper mold 2 that presses the prepreg 3 as illustrated in FIG. 4 has a rectangular shape and the pressing surface has a transverse width W of 100 mm and a depth of 300 mm. In this case, the area of the pressing surface is 10 cm×30 cm=300 cm². In addition, it is assumed that the diameter of the piston rod 5a is ϕ38 mm and the cylinder diameter of the cylinder 5 is ϕ130 mm. In addition, it is assumed that the cylinder diameter of a hydraulic cylinder in the press machine that presses the upper mold 2 is ϕ252 mm.

Here, when it is assumed that the pressure in the press machine is 25 kg/cm², the load applied to the upper mold 2 is the pressure in the press machine x the area of the hydraulic cylinder=25 kg/cm²×25.2 cm×25.2 cm×3.14/4=about 12.5 tons. In addition, when the pressure of the press is 50 kg/cm² which is twice 25 kg/cm², as a load applied to the upper mold 2, a load of 25 tons which is twice 12.5 tons when the above-mentioned pressure is 25 kg/cm² can be applied.

When the load of 12.5 tons is applied to the upper mold 2, the stress per unit area with which the prepreg 3 is pressed by the pressing surface of the upper mold 2 becomes the load/(the pressing area of the upper mold 2)=12,500 kg/300 cm²=about 42 kg/cm². When a load of 25 tons which is twice 12.5 tons is applied to the upper mold 2, the stress per unit area with which the prepreg 3 is pressed by the pressing surface of the upper mold 2 becomes about 84 kg/cm² which is twice the stress applied when a load of 12.5 tons is applied to the upper mold 2.

In addition, when it is assumed that the cylinder pressure of the cylinder 5 having a diameter of φ130 mm is 7 kg/cm², a pressing force that can be exerted to the piston rod 5a becomes the cylinder pressure x the area of the cylinder 5=7 kg/cm²×13.0 cm×13.0 cm×3.14/4=about 929 kg. In addition, the stress per unit area when the core 4 is pressed by the piston rod 5a becomes the pressing force/the area of the piston rod 5a=929 kg/3.8 cm×3.8 cm×3.14/4=about 82 kg/cm².

As described above, even though the upper mold 2 is not pressed with a large-size press machine, voids that might occur between the molding die 15 and the prepreg 3 and between the prepreg 3 and the core 4 can be eliminated in the present invention by a small-size press machine and the cylinder 5 which presses the core 4, as in the case of employing a large press machine.

Hereinabove, the configuration in which a load is applied to the upper mold 2 has been described. However, with the pressing force of the piston rod 5a as shown by the above calculations, substantially the same stress as the stress generated by a large-size press machine can be exerted to the prepreg 3. Therefore, even in a case where the molding die 15 is in the clamped state and the piston rod 5a is then operated to press the core 4, the stress can be increased to a stress I state. That is, even in a case where the piston rod 5a is operated after a load of 12.5 tons is applied to the upper mold 2, voids that might occur between the molding die 15 and the prepreg 3 and between the prepreg 3 and the core 4 can be eliminated.

In the present invention, as described above, the mold interval holding means 20 is provided in the upper mold 2 in order to maintain the vertical interval between the upper and lower molds 2 and 1 in a constant level.

When the pair of left and right pressing members 21a and 21a of the mold interval holding means 20 are horizontally moved to approach the downward sloped surfaces 2a and 2a formed in the upper end portions of the left and right side surfaces of the upper mold 2, a wedging action is performed by the downward sloped surfaces 2a and 2a formed in the upper end portions of the left and right side surfaces of the upper mold 2 and the wedge surfaces 21b and 21b. Here, the separation distance between the upper and lower molding surfaces of the upper and lower molds 2 and 1 is determined by the positions at which the movement of the pressing members 21a in the left and right direction is stopped, so that a further movement of the upper mold 2 in the upward direction is impeded. That is, when the approach of the pressing members 21a and 21a are fixed, even though a great force is applied to the upper mold 2 from below, the upper mold 2 does not further move upward and maintains the immovable state, thereby obtaining a molded product having high dimensional accuracy.

In addition, in the above description, the configurations in which the piston rod 5a is provided in the lower mold 1 has been described. However, a configuration in which the piston rod 5a is provided in the upper mold 2 may also be employed. In these cases, the piston rod 5a is provided on the upper mold 2, and the lower mold 1 is placed on a fixed base or the like so that the movement thereof is restricted. The upper mold 2 is still vertically movable. Therefore, as the configuration of the mold interval holding means 20 that do not allow the upper mold 2 to be raised when the core 4 is pressed by the piston rod 5a, the configuration as illustrated in FIG. 1 may be employed.

Modification Example 2

Modification Example 2 according to the present invention will be described with reference to FIGS. 5 and 7(B). In Modification Example 1 described above, the example which employs the mold interval holding means 20 in which the pair of pressing members 21a and 21a having the wedge surfaces 21b and 21b that are simply sloped are used as the pressing members is described. However, in Modification Example 2, a pair of pressing members 22a and 22a respectively having sawtooth-like wedge surfaces 22b and 22b are used in the mold interval holding means 20. In addition, sawtooth-like surfaces are respectively formed in both end portions of the upper mold 2 so as to come into sliding contact with the sawtooth-like wedge surfaces 22b and 22b formed in the pressing members 22a and 22a.

The other configurations are the same as those of Example 1, and the corresponding constituent members are denoted by the same reference numerals as those used in Example 1, and will not be described.

As illustrated in FIG. 7(B), the sawtooth-like wedge surfaces 22b and 22b formed in the pair of pressing members 22a and 22a have a configuration in which a shape provided with horizontal surfaces 22c and 22c formed in the horizontal direction and downward sloped surfaces 22d and 22d that are sloped downward continuously from the base ends of the horizontal surfaces 22c and 22c is repeated. In addition, as illustrated in FIG. 5, when the upper mold 2 is lowered toward the lower mold 1 and reaches a position where a predetermined pressure is applied to the prepreg 3, by operating the mold interval holding means 20, the pair of pressing members 22a and 22a are allowed to approach each other so that the horizontal surfaces of the sawtooth-like surfaces formed in the upper mold 2 and the horizontal surfaces 22c and 22c of the pressing members 22a and 22a come into surface contact with each other. Accordingly, an upward movement of the upper mold 2 can be reliably impeded.

By operating the piston rod 5a from this state, the core 4 can be forcibly pressed and deformed by the piston rod 5a. That is, by deforming the core 4 by the pressing using the piston rod 5a, voids between the core 4 and the prepreg 3 can be eliminated. Accordingly, the prepreg 3 can be pressure-molded to manufacture a high-quality molded product having desired outer circumferential surface shape with desired thickness.

Figure 5:
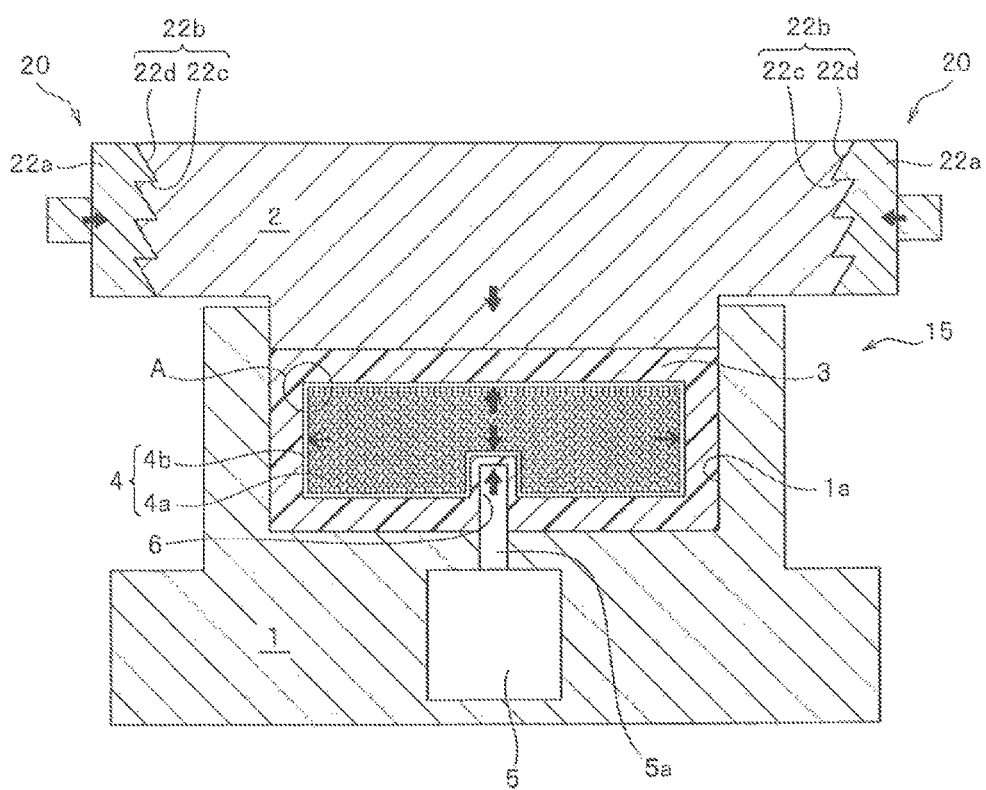
FIG. 5 is a schematic view illustrating still another embodiment of the above invention during pressure molding.

In Modification Example 2, as illustrated in FIG. 5, by using the pair of pressing members 22a and 22a that respectively have the sawtooth-like wedge surfaces 22b and 22b in the mold interval holding means 20, molding was performed in the same manner as in Example 1. The mold was opened, the molded product was taken out, and a discharge hole was bored through the concave portion 6 (FIG. 3(a)) formed by the pressing of the piston rod to discharge the grain group 4a to the outside through the discharge hole (FIG. 3(b)), thereby obtaining a hollow molded product (FIG. 3(c)). This molded product has high dimensional accuracy and excellent appearance without defects such as wrinkles on the outer surface.

Modification Example 3

The configuration of Modification Example 3 according to the present invention will be described with reference to FIGS. 6 and 7(C). In Modification Example 1, the configuration in which the pair of pressing members 21a and 21a having the wedge surfaces 21b and 21b that is simply sloped are used as the mold interval holding means 20 has been described. However, in Modification Example 3, as the mold interval holding means 20, a pair of pressing members 23a and 23a having wedge portions 23b and 23b having upward sloped surfaces formed on the lower surfaces that extend in the transverse direction, and vertical portions 23f and 23f that extend vertically downward from the outer side end portion thereof are used. In addition, both the left and right end portions of the upper mold 2 are formed to have surface shapes that come into close contact with the opposing surfaces of the pressing members 23a and 23a when the pair of pressing members 23a and 23a abut on both the end portions.

In Modification Example 3, the upper molding surface on the upper mold 2 is not simply flat surface but is configured to be provided with a protrusion 8.

The other configurations are the same as those of Comparative Example 1, and corresponding constituent members are denoted by the same reference numerals as those used in Example 1, and the corresponding constituent members will not be described.

As illustrated in FIG. 7(C), each of the wedge portions 23b and 23b formed in the pair of left and right pressing members 23a and 23a is constituted by a wedge portion 23b having a shape provided with an upward sloped surface 23c that extends in the transverse direction toward the upper mold 2 and vertical surfaces 23d and 23e that vertically extend from both end edge sides of the upward sloped surface 23c, and the vertical portion 23f. Here, as illustrated in FIG. 6, as the sloped surfaces of both the left and right end portions of the upper mold 2 come into surface contact with the upward sloped surfaces 23c and 23c of the pressing members 23a and 23a, an upward movement of the upper mold 2 can be reliably impeded. In addition, the upper mold 2 is moved in a direction approaching or away from the lower mold 1 by slidably moving the pair of pressing members 23a and 23a in a direction in which they move near to or away from each other, thereby adjusting the interval between the upper mold 2 and the lower mold 1.

Figure 6:
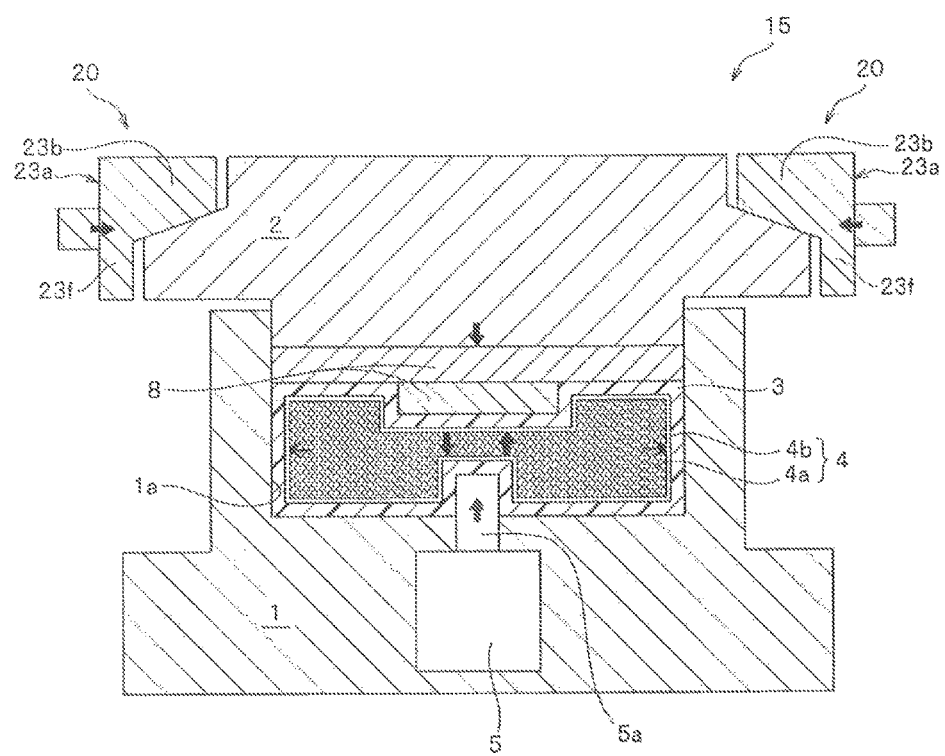
FIG. 6 is a schematic view illustrating still further another embodiment of the above invention during pressure molding.

As illustrated in FIG. 6, when the prepreg 3 is pressure-molded by lowering the upper mold 2 toward the lower mold 1, the core 4 is forcibly pressed by the protrusion 8 provided on the upper mold 2. In addition, in the pressurized state, when the pair of pressing members 23a and 23a are allowed to approach each other by operating the mold interval holding means 20, the sloped surfaces formed in the upper mold 2 come into surface contact with the upward sloped surfaces 23c and 23c of the pressing members 23a and 23a such that the upward movement of the upper mold 2 is reliably impeded and the upper mold 2 is held in a fixed position.

By operating the piston rod 5a from this state, the core 4 is forcibly pressed and deformed between the protrusion 8 and the piston rod 5a. Accordingly, as described above, the core 4 is deformed and voids between the core 4 and the prepreg 3 can be eliminated. In this manner, even in this example, a high-quality hollow fiber-reinforced plastic molded product having desired outer circumferential shape with desired thickness can be manufactured.

In Modification Example 3, as illustrated in FIG. 6, the upper molding surface on the upper mold 2 is not a simply flat surface but is configured to be provided with the protrusion 8, and by using the pair of pressing members 23a and 23a that have the wedge portions 23b and 23b having the upward sloped surfaces formed on the lower surfaces that extend in the transverse direction and the vertical portions 23f and 23f that extend vertically downward from the outer side end portion thereof as the mold interval holding means 20, molding was performed in the same manner as in Example 1. The mold was opened, the molded product was taken out, and a discharge hole was bored through the concave portion 6 formed by the pressing of the piston rod to discharge the grain group 4a to the outside through the discharge hole, thereby obtaining a hollow molded product. This molded product has high dimensional accuracy and excellent appearance without defects such as wrinkles on the outer surface.

Figure 7:
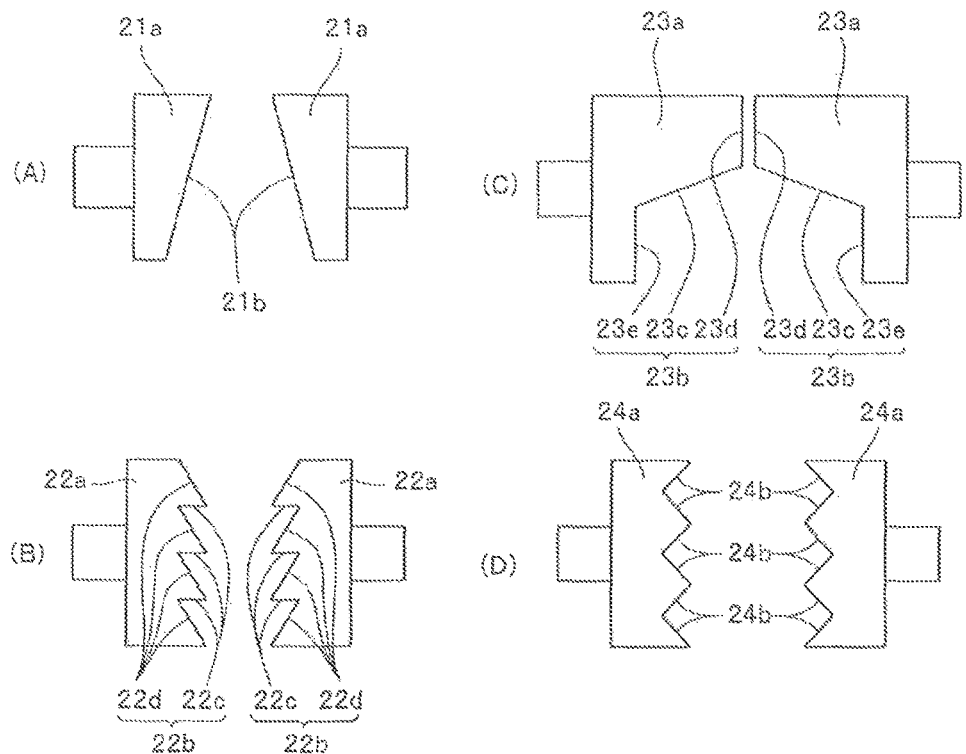
FIGS. 7(A)-7(D) are schematic views illustrating a configuration example of mold interval holding means in the above invention.
Figure 8:
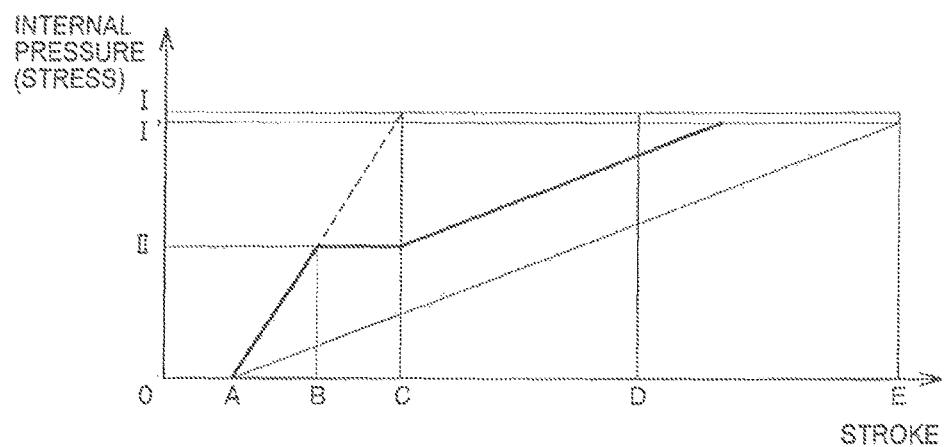
FIG. 8 is a schematic view illustrating the relationship between internal pressure (stress) and stroke.

As the configuration of the pair of pressing members in the mold interval holding means 20, various configurations as illustrated in FIG. 7 may be employed. The configurations of FIGS. 7(A) to 7(C) have been described as Modification Examples 1 to 3 described above. A further modification example of the pressing members of Modification Example 2 illustrated in FIGS. 2 and 7(B) will be described with reference to FIG. 7(D). A pair of pressing members 24a and 24a illustrated in FIG. 7(D) are formed so that the shapes of the wedge surfaces 24b and 24b are sawtooth shapes, and the sawtooth shapes are not sawtooth shapes with one-directional ramps illustrated in FIG. 7(B) described in Modification Example 2 but are sawtooth shapes with two-directional ramps. In this example, although not illustrated, both left and right end portions of the upper mold 2 have wedge surfaces formed to correspond to the shapes of the wedge surfaces 24b and 24b.

When the mold interval holding means 20 is operated in the above-described configuration, the wedge surfaces 24b and 24b in the pair of pressing members 24a and 24a are engaged with the wedge surfaces formed in both end portions of the upper mold 2, thereby completely impeding both the upward and downward movements of the upper mold 2.

Figure 9:
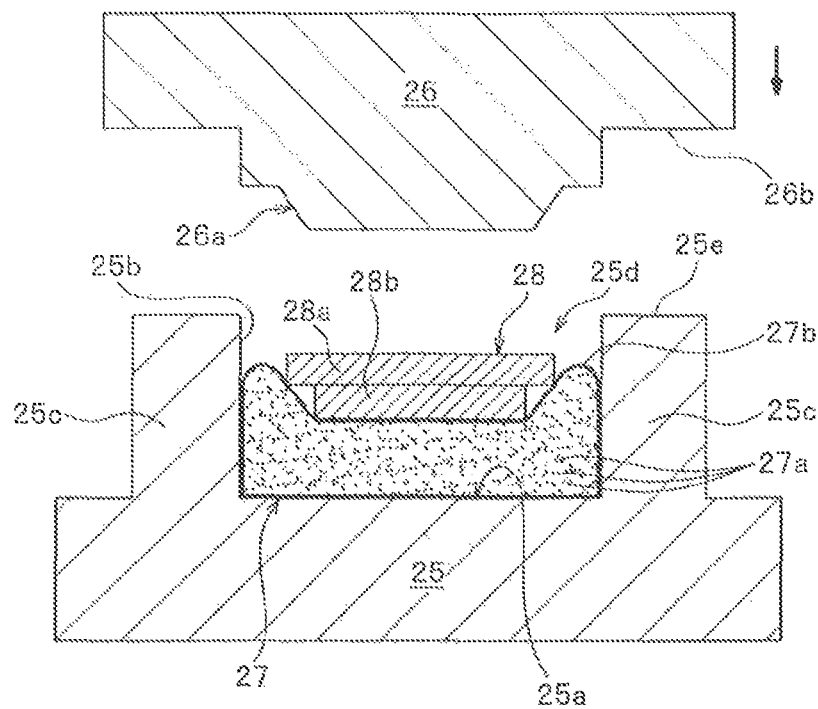
FIG. 9 is an explanatory view schematically illustrating the arrangement relationship between a mold, a deforming mold, and a prepreg at the time of starting molding of the present invention having the second basic configuration.
Figure 10:
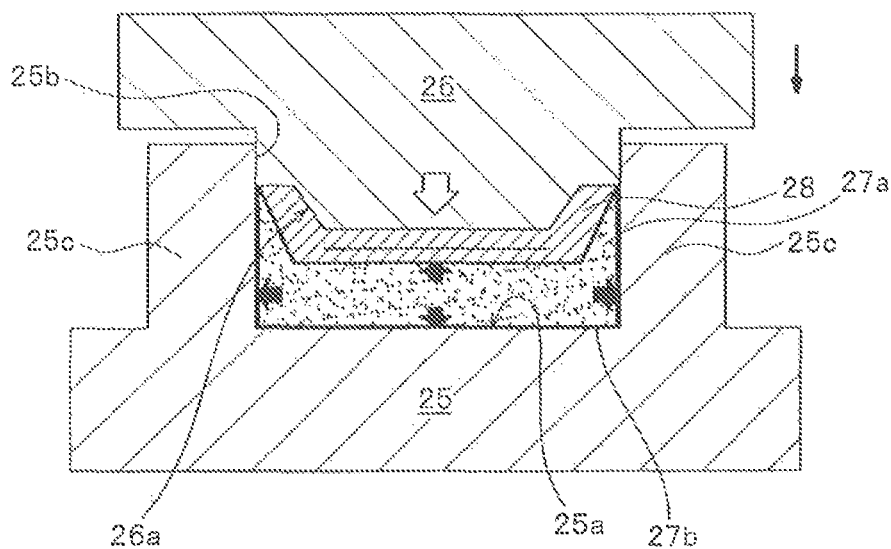
FIG. 10 is an explanatory view schematically illustrating the arrangement relationship between the mold, the deforming mold, and the prepreg at the time of ending the molding of the present invention having the second basic configuration.

Hereinafter, a representative embodiment of the present invention having the second basic configuration described above will be described in detail with reference to the accompanying drawings. FIGS. 9 and 10 schematically illustrate a process of molding the fiber-reinforced plastic molded product in this embodiment. In the drawings, reference numeral 25 denotes a housing, reference numeral 26 denotes an one-sided mold which is one of a pair of molding molds, reference numeral 27 denotes a deformable deforming mold which is the other molding molds that is the most characteristic in the present invention, and reference numeral 28 denotes a prepreg which is the raw material to be molded.

The housing 25 is made of cast iron and has a box shape with a floor surface portion 25a and side wall portions 25c that are erected along the circumferential edge portion of the floor surface portion 25a, and the entire surface of the top plate portion thereof is opened and forms an opening 25d. The one-sided mold 26 is made of the same material as that of a typical molding die and has a molding surface 26a for molding one surface of the fiber-reinforced plastic molded product.

The deforming mold 27 has a configuration in which grains 27a are accommodated in a state of being sealed in a bag 27b made of a flexible material and is deformable by external force. As the grains 27a, ceramic balls such as alumina balls and zirconia balls or metallic balls such as chrome steel balls, carbon steel balls and stainless steel balls are used. Among these, alumina balls and metallic balls are appropriate due to their excellent thermal conductivity and carbon steel balls are particularly appropriate. The sizes thereof are preferably ϕ0.1 mm to ϕ10 mm, and particularly preferably ϕ0.5 mm ϕ2 mm in order to secure deformation performance in fine regions of the deforming mold 27. As the bag 27b that accommodates the grain 27a, a film or sheet made of nylon, polyethylene, a fluororesin, silicone rubber, or the like is appropriately used.

The prepreg 28 is made by impregnating a fiber aggregation such as sheet-like carbon fiber, glass fiber, aramid fiber, or silicon carbide fiber with an uncured thermosetting resin or a thermoplastic resin as a matrix resin. In this embodiment, as the prepreg 28, a laminate of prepreg in which a second prepreg sheet 28b having a smaller area is laminated on and integrated with the center portion of the lower surface of a first single prepreg sheet 28a having a larger area is used, and the prepreg 28 is placed at the center portion of the upper surface of the deforming mold 27. Here, in general, the fiber aggregation preferably has directionality of fiber, and examples thereof include a sheet-like material in which fiber is arranged in parallel in one direction, a sheet-like material in which a plurality of sheet-like materials in each of which fiber is arranged in one direction are laminated for the direction of fiber to be intersected in a range of a required angle (0° to 90°), a so-called unidirectional woven fabric obtained by arranging a number of fiber bundles as warp threads and allowing weft threads to cross the warp threads at required intervals, and a bidirectional woven fabric obtained by using a number of fiber bundles as warp threads and weft threads and crossing the threads each other. Typically, the fiber bundle is made of a large number of filament threads.

In addition, in the case where a thermosetting resin is used as the matrix resin, the prepreg 28 which is in the molten state by heating the mold is heated and pressurized in the housing 25 to be pressure-molded and cured, thereby manufacturing a fiber-reinforced plastic molded article having a desired shape. In the case of impregnating a thermoplastic resin instead of the thermosetting resin, a preform made by shaping the prepreg 28 in advance as necessary is heated in advance and is placed on the deforming mold 27, and the one-sided mold 26 is lowered to pressurize and cool the preform, thereby manufacturing a fiber-reinforced plastic molded article having a desired shape.

As the thermosetting resin impregnated in the fiber, epoxy resin, urea resin, vinyl ester resin, unsaturated polyester, polyurethane, phenolic resin, and the like may be used. As the thermoplastic resin, polypropylene, polyethylene, polystyrene, vinyl chloride, polyamide resin, and the like may be used.

In the above configuration, in order to mold the fiber-reinforced plastic molded product illustrated in FIGS. 9 and 10, first, the one-sided mold 26 is tightly fitted into the opening 25d of the housing 25 and is thereafter moved while applying a required weight toward the housing floor surface portion 25a. Due to this movement, the pressing force of the one-sided mold 26 exerted on the prepreg 28 placed on the deforming mold 27 gradually increases. By the increasing pressing force, the upper surface of the prepreg 28 is shaped into a shape that follows the molding surface 26a of the one-sided mold 26. Moreover, the deforming mold 27 on which the prepreg 28 is placed also receives the same pressing force at this time such that the deforming mold 27 itself is deformed while deforming the placing surface of the prepreg 28. The deformation of the deforming mold 27 is achieved by the grains 27a that flow toward the clearance spaces formed between the one-sided mold 26 and the housing 25 due to the pressing force of the one-sided mold 26 and the reaction from the floor surface of the housing 25. By deforming the deforming mold 27 using the flow of the grains 27a as such, the internal stress of the prepreg 28 is finally uniformized and the shape of the prepreg 28 on the opposite side to the mold becomes a shape according to the stress.

Figure 11:
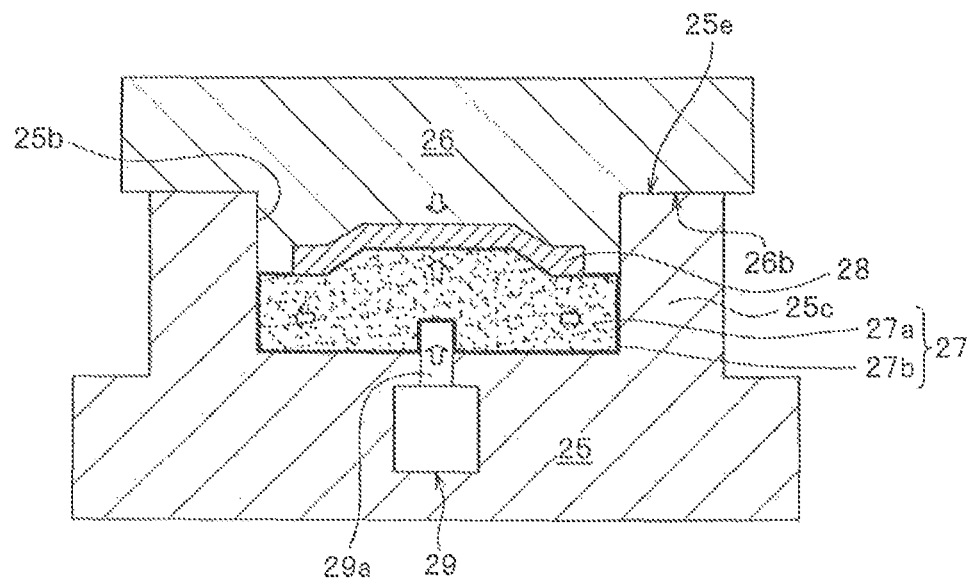
FIG. 11 is an explanatory view schematically illustrating the arrangement relationship between the mold, the deforming mold, and the prepreg at the time of ending the molding in another embodiment of the present invention having the second basic configuration.
Figure 12:
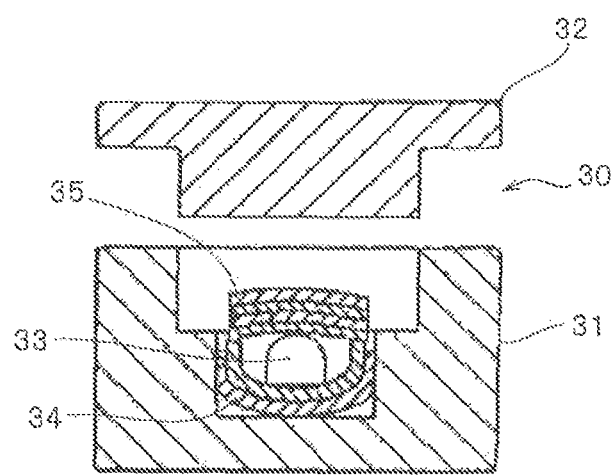
FIG. 12 is an explanatory view illustrating a molding state of a molded product having a hollow portion according to Conventional Example 1.
Figure 13:
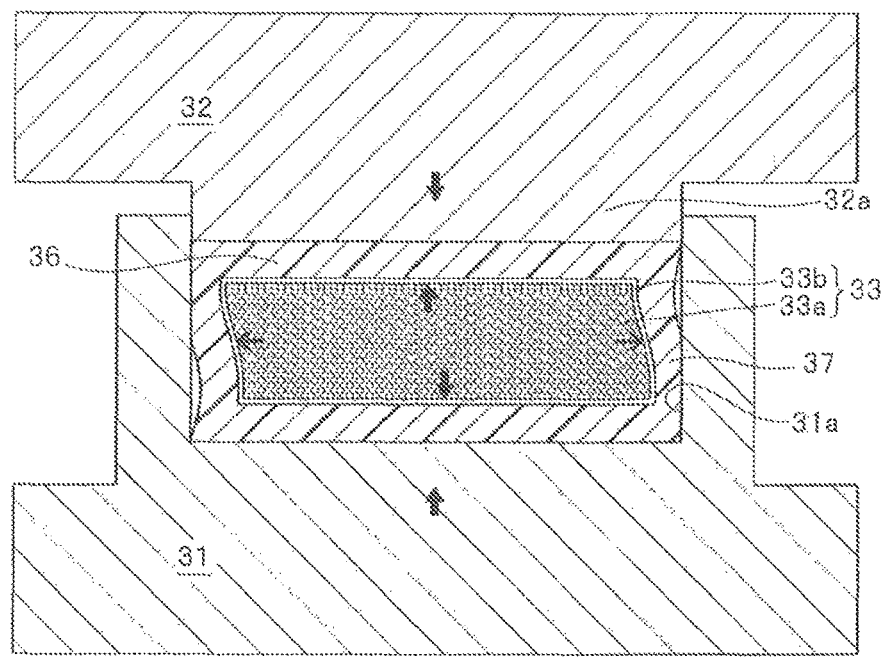
FIG. 13 is an explanatory view schematically illustrating pressure molding of FIG. 12.
Figure 14:
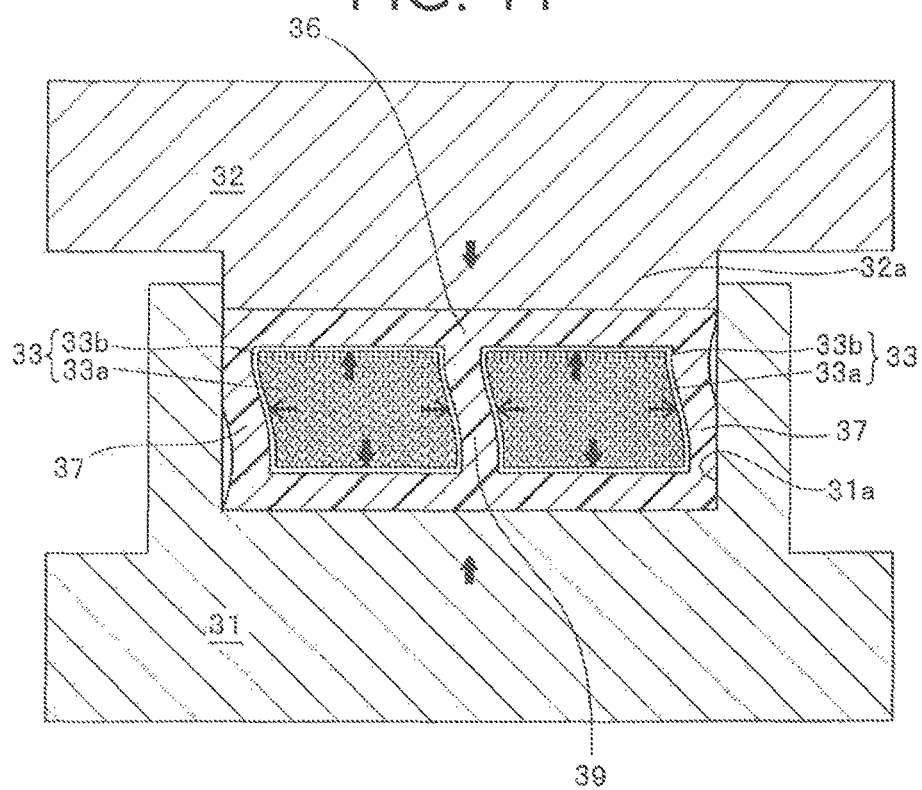
FIG. 14 is an explanatory view schematically illustrating another molding state during the pressure molding of FIG. 13.
Figure 15:
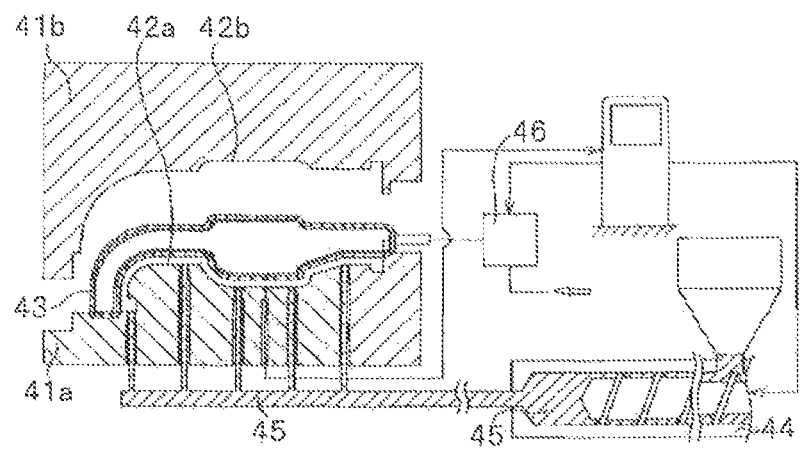
FIG. 15 is an explanatory view illustrating a state where a core is set between molding molds according to Conventional Example 2.
Figure 16:
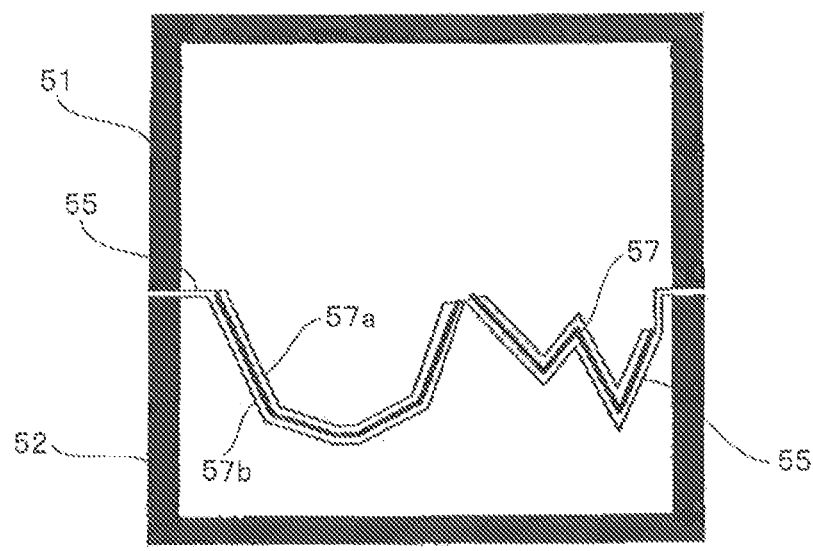
FIG. 16 is an explanatory view schematically illustrating a state of a molded product having an open cross-section during molding.

FIG. 11 illustrates another representative embodiment of the present invention. According to this embodiment, a cylinder 29 having a piston rod 29a corresponding to a portion of auxiliary pressing means of the invention, which is able to come in and out of the deforming mold 27 placed in the housing 25 is provided in the floor surface portion 25a of the housing 25. In addition, in this embodiment, corresponding constituent members that are substantially the same as those of the above-described embodiment illustrated in FIGS. 9 and 10 are denoted by the same reference numerals and names. In FIG. 11, the illustration of a pipe through which an operating fluid is supplied to and discharged from the pressure chamber of the cylinder 29 to allow the piston rod 29a to slidably move is omitted. The piston rod 29a is used when, for example, the prepreg 28 is small and the deformation of the deforming mold 27 does not reach every corner of the housing 25 and the one-sided mold 26, and by operating the cylinder 29, a uniform pressing force is applied to the prepreg 28 while increasing the internal pressure of the deforming mold 27 and increasing the volume of the deforming mold.

That is, in a case where the clearance spaces still remain between the one-sided mold 26 and the housing 25 even when a clamping portion 26b of the one-sided mold 26 abuts on a clamping portion 25e of the housing 25, the cylinder 29 is operated to allow the piston rod 29a to extend toward the deforming mold 27 and locally press and deform the deforming mold 27. As a result, the internal pressure thereof is increased and thus the grains 27a are allowed to flow toward the clearance spaces to fill the clearance spaces while deforming the deforming mold 27. Air in the clearance spaces is pressurized by the internal pressure of the deforming mold 27 and the pressing of the grain bodies 27a or is discharged to the atmosphere from a slight gap between the housing 25 and the one-sided mold 26 through the prepreg 28. Air passages formed when the air passes through the prepreg 28 are naturally filled by the melted prepreg 28 after the air passes.

The deforming mold 27 is deformed and extends toward the clearance spaces from which air is extruded and has a shape that follows the corner portion shape of the one-sided mold 26, and simultaneously, the prepreg 28 also follows the shape. Accordingly, the molded product formed by heating and pressurizing the prepreg 28 is molded so that the outer surface side thereof has a shape as the shape of the molding surface 26a of the one-sided mold 26 and the inner surface on the opposite side thereof has a shape that follows the deformation of the prepreg 28 based on the shape of the molding surface 26a.

As illustrated in FIG. 11, by locally pressing a portion of the outer circumferential surface of the deforming mold 27 by the piston rod 29*a*, a concave portion is formed in the outer circumferential surface of the deforming mold 27. When the outer circumferential surface of the deforming mold 27 is pressed by the piston rod 29*a*, the volume in the deforming mold is in a state in which the volume of the protruding piston rod 29*a* is forcibly added to the volume of all the grains 27*a*. As a result, the deforming mold 27 is deformed while expanding and, at the same time, the internal pressure of the deforming mold 27 can be increased.

As the internal pressure of the deforming mold 27 is increased, a slip occurs between the grains 27*a* such that the grains 27*a* move in all directions. However, since the flexible bag 27*b* that wraps the grains 27*a* therein is made of an easily deformable material, the bag 27*b* can be extended without substantially limiting the movement of the grains 27*a*.

As described above, since a slip occurs between the grains 27*a* by increasing the internal pressure of the deforming mold 27, the outer circumferential surface area of the deforming mold 27 can be increased. Accordingly, as illustrated in FIG. 11, voids between the molding surface 26*a* of the one-sided mold 26 and the prepreg 28 can be eliminated. Moreover, since an increase in the outer circumferential surface shape of the deforming mold 27 occurs in a part with a low pressure between the one-sided mold 26 and the prepreg 24 where clearance spaces generates, and thus the thickness of the prepreg 28 is uniformized while eliminating the clearance spaces. In this manner, the prepreg 28 can be pressure-molded into desired outer circumferential surface shape with desired thickness.

EXPLANATIONS OF LETTERS OR NUMERALS

1 lower mold
1*a* concave portion formed in lower mold
2 upper mold
2*a* downward sloped surface
3 prepreg
4 core
4*a* grain group (grains)
4*b* flexible bag
5 cylinder
5*a* piston rod
6 concave portion
6*a* discharge hole
8 protrusion
10 molded product
10*a* semi-finished product
15 molding die
20 mold interval holding means
21*a* pressing member
21*b* wedge surface
22*a* pressing member
22*b* wedge surface
22*c* horizontal surface
22*d* downward sloped surface
23*a* pressing member
23*b* wedge portion
23*c* upward sloped surface
23*d*, 23*e* vertical surface
23*f* vertical portion
24*a* pressing member
24*b* wedge surface
25 housing
25*a* floor surface
25*b* vertical wall surface
25*c* side wall portion
25*d* opening
25*e* clamping portion
26 one-sided mold
26*a* molding surface
26*b* clamping portion
27 deforming mold
27*a* grains
27*b* bag
28 prepreg
28*a*, 28*b* first and second prepreg sheets
29 cylinder
29*a* piston rod
30 mold
31 lower mold
31*a* concave portion
32 upper mold
33 core
33*a* powder grain group
33*b* packaging material
34, 35 fiber-reinforced thermoplastic resin material (FRTP)
36 prepreg
37 vertical part
39 rib
41*a*, 41*b* molds
42*a*, 42*b* molding surface
43 core
44 extruder
45 molten resin
46 pressurizing unit
51, 52 first and second pressure chambers
55 chamber wall
57 mold assembly
57*a*, 57*b* mold part

The invention claimed is:

1. A method for molding a molded article of fiber-reinforced plastic having a closed cross-section comprising:
    forming a core having a desired shape by accommodating a grain group containing a plurality of high-rigidity grains in a flexible bag;
    disposing a prepreg containing a resin and fiber so as to wrap around the core;
    disposing the core and the prepreg wrapping around the core between an upper mold and a lower mold of a molding die; and
    performing compression molding by closing the molding die;
    wherein the method includes:
    holding the upper mold and the lower mold by mold interval holding means so as not to cause an interval therebetween to be increased;
    pressing a part of outer surface of the core, via the prepreg or not via the prepreg, to increase internal pressure of the core and deform the core by pressing means which comes into the cavity between the upper mold and the lower mold; and
    eliminating voids between the core and the prepreg by the pressing and the deformation of the core.

2. The method for molding a molded article of fiber-reinforced plastic having a closed cross-section according to claim 1, further comprising
    completely restricting an upward movement of the upper mold by moving the mold interval holding means disposed in left and right side portions of the upper mold by a predetermined amount in a direction in which the mold interval holding means approach each other.

3. The method for molding a molded article of fiber-reinforced plastic having a closed cross-section according to claim 2, further comprising
forming left and right side surfaces of the upper mold and abutting surfaces of the mold interval holding means as wedge-shaped sliding surfaces.

4. The method for molding a molded article of fiber-reinforced plastic having a closed cross-section according to claim 1,
wherein grain diameters of the grain group accommodated in the flexible bag are not uniform.

5. The method for molding a molded article of fiber-reinforced plastic having a closed cross-section according to claim 1,
wherein a part of the prepreg via which a part of outer surfaces of the core was pressed serves as a formation part of a discharge hole through which the grain group is discharged from the molded article.

6. The method for molding a molded article of fiber-reinforced plastic having a closed cross-section according to claim 1,
wherein the grain group accommodated in the flexible bag includes high-rigidity grains,
the grain group includes a first grain group (a) and a second grain group (b) having different grain diameters, and
the ratio Da/Db of the diameter Da of the first grain group (a) to the diameter Db of the second grain group (b) is equal to or higher than 1.1 and equal to or less than 2.0.

7. The method for molding a molded article of fiber-reinforced plastic having a closed cross-section according to claim 6,
wherein a ratio of the total amount of the second grain group (b) to the total amount of the grain group accommodated in the flexible bag is in a range of 20 to 60 mass %.

8. The method for molding a molded article of fiber-reinforced plastic having a closed cross-section according to claim 7, further comprising:
holding the upper mold and the lower mold by mold interval holding means so as not to cause an interval therebetween to be increased;
pressing a part of outer surfaces of the core, via the prepreg or not via the prepreg to increase an internal pressure of the core and deform the core by pressing means which comes into the cavity between the upper mold and the lower mold; and
eliminating voids between the core and the prepreg by the pressing and the deformation of the core.

9. The method for molding a molded article of fiber-reinforced plastic having a closed cross-section according to claim 8, further comprising
completely restricting an upward movement of the upper mold by moving the mold interval holding means disposed in left and right side portions of the upper mold by a predetermined amount in a direction in which the mold interval holding means approach each other.

10. The method for molding a molded article of fiber-reinforced plastic having a closed cross-section according to claim 9, further comprising
forming left and right side surfaces of the upper mold and abutting surfaces of the mold interval holding means as wedge-shaped sliding surfaces.

11. The method for molding a molded article of fiber-reinforced plastic having a closed cross-section according to claim 8, further comprising
pressing the portion of the outer surface of the core by inserting a rod into the cavity of the molding die.

12. The method for molding a molded article of fiber-reinforced plastic having a closed cross-section according to claim 11, wherein the rod is a piston rod.

13. The method for molding a molded article of fiber-reinforced plastic having a closed cross-section according to claim 12, further comprising
discharging the grain group to outside of the molded article through an insertion position of the rod in the prepreg after the compression molding.

14. The method for molding a molded article of fiber-reinforced plastic having a closed cross-section according to claim 6, wherein the flexural modulus of the high-rigidity grain is equal to or higher than 50,000 MPa.

15. The method for molding a molded article of fiber-reinforced plastic having a closed cross-section according to claim 14, wherein the high-rigidity grain is ceramic grain.

16. The method for molding a molded article of fiber-reinforced plastic having a closed cross-section according to claim 1, wherein the grain group contains the high-rigidity grain and resin grain.

17. The method for molding a molded article of fiber-reinforced plastic having a closed cross-section according to claim 16, wherein the flexural modulus of the resin grain is 10 to 3000 MPa.

18. The method for molding a molded article of fiber-reinforced plastic having a closed cross-section according to claim 17, wherein the resin grain is polyolefin grain.

19. The method for molding a molded article of fiber-reinforced plastic having a closed cross-section according to claim 17, further comprising:
holding the upper mold and the lower mold by mold interval holding means so as not to cause an interval therebetween to be increased;
pressing a part of outer surfaces of the core, via the prepreg or not via the prepreg, to increase an internal pressure of the core and deform the core by pressing means which comes into the cavity between the upper mold and the lower mold; and
eliminating voids between the core and the prepreg by the pressing and the deformation of the core.

20. The method for molding a molded article of fiber-reinforced plastic having a closed cross-section according to claim 19, further comprising
completely restricting an upward movement of the upper mold by moving the mold interval holding means disposed in left and right side portions of the upper mold by a predetermined amount in a direction in which the mold interval holding means approach each other.

21. The method for molding a molded article of fiber-reinforced plastic having a closed cross-section according to claim 20, further comprising
forming left and right side surfaces of the upper mold and abutting surfaces of the mold interval holding means as wedge-shaped sliding surfaces.

22. The method for molding a molded article of fiber-reinforced plastic having a closed cross-section according to claim 19, further comprising
pressing the portion of the outer surface of the core by inserting a rod into the cavity of the molding die.

23. The method for molding a molded article of fiber-reinforced plastic having a closed cross-section according to claim 22, wherein the rod is a piston rod.

24. The method for molding a molded article of fiber-reinforced plastic having a closed cross-section according to claim 23, further comprising
discharging the grain group to outside of the molded article through an insertion position of the rod in the prepreg after the compression molding.

25. The method for molding a molded article of fiber-reinforced plastic having a closed cross-section according to claim 16, wherein the flexural modulus of the high-rigidity grain is equal to or higher than 50,000 MPa.

26. The method for molding a molded article of fiber-reinforced plastic having a closed cross-section according to claim 25, wherein the high-rigidity grain is ceramic grain.

* * * * *